United States Patent
Van Harmelen

(10) Patent No.: US 10,672,287 B2
(45) Date of Patent: Jun. 2, 2020

(54) METHOD AND SYSTEM FOR MANAGING ASSESSMENTS

(71) Applicant: Mark Van Harmelen, Manchester (GB)

(72) Inventor: Mark Van Harmelen, Manchester (GB)

(*) Notice: Subject to any disclaimer, the term of this patent is extended or adjusted under 35 U.S.C. 154(b) by 489 days.

(21) Appl. No.: 14/483,719

(22) Filed: Sep. 11, 2014

(65) Prior Publication Data

US 2015/0072334 A1    Mar. 12, 2015

Related U.S. Application Data

(60) Provisional application No. 61/876,487, filed on Sep. 11, 2013.

(51) Int. Cl.
*G09B 7/08* (2006.01)
*G09B 7/06* (2006.01)
*G09B 19/00* (2006.01)

(52) U.S. Cl.
CPC .............. *G09B 7/08* (2013.01); *G09B 7/06* (2013.01); *G09B 19/00* (2013.01)

(58) Field of Classification Search
CPC .................................. G09B 7/08; G09B 7/06
See application file for complete search history.

(56) References Cited

U.S. PATENT DOCUMENTS

2010/0313114 A1* 12/2010 Colbran ............... G06F 17/241
                                                                715/230

* cited by examiner

*Primary Examiner* — James B Hull
(74) *Attorney, Agent, or Firm* — Nixon & Vanderhye, P.C.

(57) ABSTRACT

The present invention relates to a method of managing an assessment, including selecting a portion or position in an answer to a question of one or more questions within an assessment in response to a first user input; assigning a grade and/or feedback to the selected portion or position in response to a second user input; and associating the grade and/or feedback to one of a plurality of criteria in response to a third user input. Other methods and systems for managing an assessment are also disclosed.

4 Claims, 39 Drawing Sheets

Figure 6a

| No. | Question text | marks | | |
|---|---|---|---|---|
| 1 | Question one text | 2 | Edit rubric | X |
| 2 | Question two text | 2 | Edit rubric | X | question text | marks

600

Add question

Figure 6b

| No. | Question text | marks | | |
|---|---|---|---|---|
| 1 | Question one text | 2 | Hide rubric | X |

Add model answer model answer

Add criteria

| Name | Description | Marks | | |
|---|---|---|---|---|
| Example | One mark for xyz | 1 | X | ~601 |
| 602 criterion | criterion description | marks | | |

Add criterion 603          604

| 2 | Question two text | 2 | Edit rubric | X | question text | marks

Add question

| Filter ▼ | | | | | | | | | | | | | | | | marking | feedback | model answer |
|---|---|---|---|---|---|---|---|---|---|---|---|---|---|---|---|---|---|---|
| Sort ▼ | | | | | | | | | | | | | | | | | | |
| | S1 | S2 | S3 | S4 | S5 | S6 | S7 | S8 | S9 | S10 | S11 | S12 | S13 | S14 | | | | |

Overview

Q1 — Mention where you come from, and describe the topography and weather of that place or the district it [See more] ⚑ Flag

Q2

Q3 — Cambridge is situated about 50 miles north-by-east of London. The city is located in an area of level and relatively low-lying terrain just south of the Fens, which varies between 6 metres and 24 metres above sea level.

Q4

Q5 — The town was thus historically surround by low lying wetlands that have been drained as the town has expanded.

The underlying geology of Cambridge consists of gault clay and Chalk Marl, known locally as Cambridge Greensand, partly overlayed by terrace gravel.

The River Cam flows through the city. It is bordered by water meadows within the city such as Sheep's Green.

Located in the driest region of Britain, Cambridge's rainfall averages just under 560 mm per year, around half the national average. Snowfall is small, in part because of Cambridge's low elevation.

Due to its low lying, inland, and easterly position within the British Isles, summer temperatures tend to be somewhat higher than areas further west, and often rival or even exceed those recorded in the London area.

Sunshine averages around 1,500 hours a year or around 35% of possible, a level typical of most locations in inland central England.

The relative distance from incoming Atlantic winds tends to avoid precipitation, and because of the low elevation of the surrounding area, winds off the channel are not forced up to drop rain.

---

-/25

-/10 Topography
One mark per pertinent fact for major aspects of topography, eg terrain, river(s), mountainside(s)

[Marks] [General feedback for Topography]

-/4 Weather
Basic description of weather, eg seasonal weather patterns

[Marks] [General feedback for Weather]

-/3 Causes of weather
One mark per cause of weather patterns

[Marks] [General feedback for Causes of weather]

-/4 Style
Style including readability that contributes to conveying information effectively: 0=hard to read,
1=stumbles,
2=competent, some mistakes OK
3=competent
4=excellent, smoothly and consistently supports presentation of information

[Marks] [General feedback for Style]

-/4 Structure, cohesiveness and flow
These marks contribute to the total: +1 = structure good OR +2 = structure very good to excellent, +1 = cohesive sections, related info not scattered in answer, +1 = good flow

[Marks] [General feedback for Structure, cohesiveness]

[Resume Later]

Figure 7a

Marking

--/10

---

--/5 Criterion One

Description establishing levels of performance and marks to be awarded for criterion one.

| Mark | General comment for criterion |

---

--/5 Criterion Two

Description establishing levels of performance and marks to be awarded

| Mark | General comment for criterion |

Figure 10a

| marking | feedback | model answer |

-/25 grading panel  [⚑ Flag]

-/10 Topography  *rubric*
One mark per pertinent fact for major aspects of topography, eg terrain, river(s), mountainside(s)
[Marks] [General feedback for Topography]

-/4 Weather
Basic description of weather, eg seasonal weather patterns
[Marks] [General feedback for Weather]

-/3 Causes of weather
One mark per cause of weather patterns
[Marks] [General feedback for Causes of weather]

-/4 Style  *criterion*
Style including readability that contributes to conveying information effectively: 0=hard to read, 1=stumbles, 2=competent, some mistakes OK 3=competent 4=excellent, smoothly and consistently supports presentation of information   *description/ grading guide*
[Marks] [General feedback for Style]

-/4 Structure, cohesiveness and flow
These marks contribute to the total: +1 = structure good OR +2 = structure very good to excellent, +1 = cohesive sections, related info not scattered in answer, +1 = good flow
[Marks] [General feedback for Structure, cohesiveness]

Figure 10b

Marking

--/10

---

--/5 Criterion One

Description establishing levels of performance and marks to be awarded for criterion one.

| Mark | General comment for criterion |

---

--/5 Criterion Two 1002

Description establishing levels of performance and marks to be awarded

| Mark | General comment for criterion |

1000 — | Mark | Positional feedback 1005 | X |

1003 "text from the answer that the positional feedback and/or mark ✓ 1007 applies to"

1001 — | Mark | Positional feedback 1006 | X |

1004 "text from the answer that the positional feedback and/or mark — 1008 applies to"

Figure 10c

Marking

3/10

---

0/5 Style

5 = polished
3 = reasonable, with only a few stylistic gaffes
0 = ungrammatical throughout

| | General comment for criterion |

---

3/5 Fiscal

Must show financial performance over time and discuss reasons

| | General comment for criterion |

---

| 3 | For graph and text, but explain blip | X |

1010

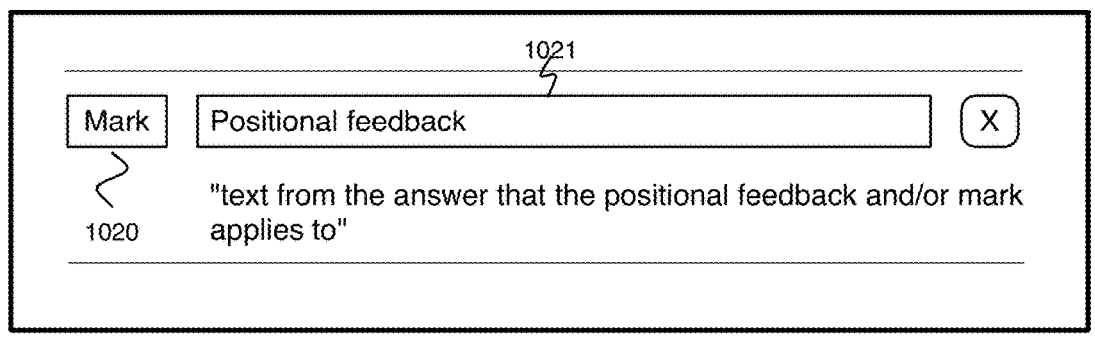
Figure 10e
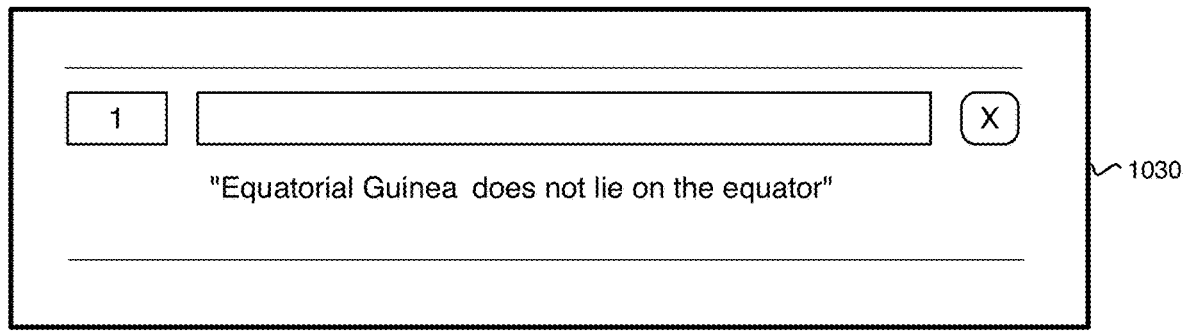
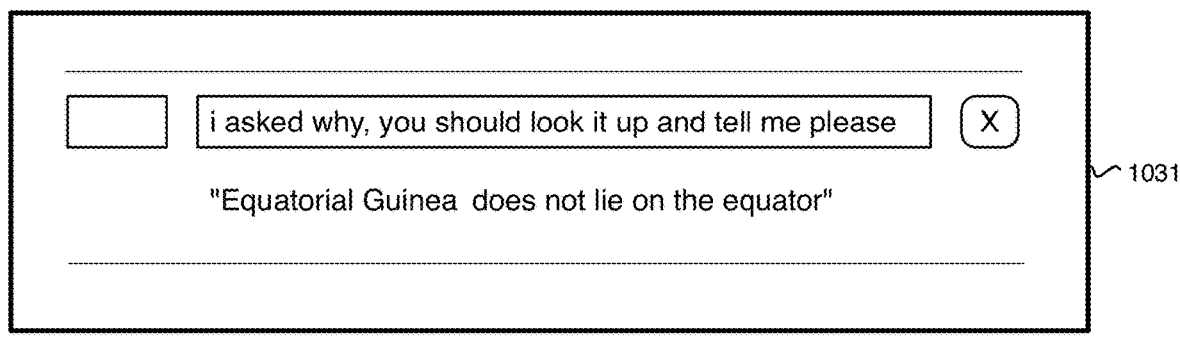
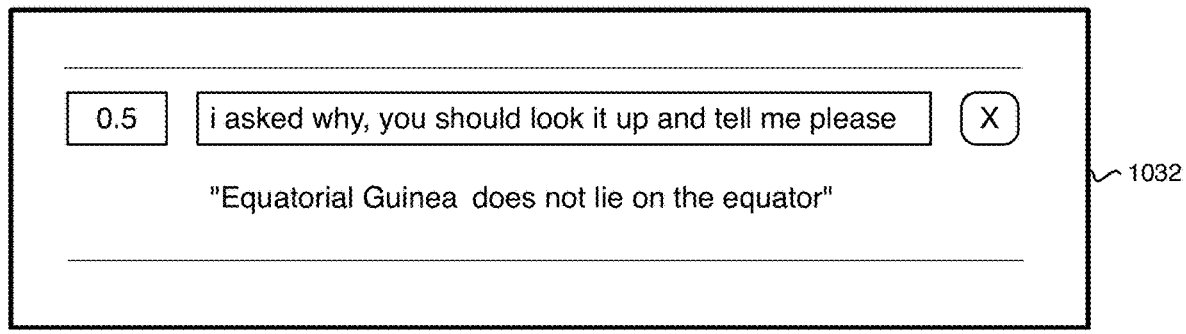
Figure 10f before editing

| 0.5 | You were asked why EG doesn't lie on the equator | X |

"The equator goes through Equatorial Guinea"

after editing

| It's actually not on the equator, please look it up and tell me why | X |

"The equator goes through Equatorial Guinea"

Figure 10g

Marking

1058 — 6/10

---

1057 — 2/5 Criterion One

Description establishing levels of performance and marks to be awarded for criterion one.

| 2 | General comment for criterion |

---

1055 — 4/5 Criterion Two    1054

Description establishing levels of performance and marks to be awarded

1056 — | 1 | General comment for criterion |

---

1050 — | 1 | Positional feedback | X |

1052 — "text from the answer that the positional feedback and/or mark applies to"

---

1051 — | 2 | Positional feedback | X |

1053 — "text from the answer that the positional feedback and/or mark applies to"

Figure 10i

Answer

Lorem ipsum dolor sit amet, consectetur adipiscing elit. Curabitur aliquam iaculis eros vitae hendrerit. Aliquam in felis convallis, dapibus libero id, facilisis ipsum. Fusce eget dignissim ligula, in sollicitudin ultrices elit vel feugiat. Nullam aliquam tellus et mauris iaculis, ut commodo orci ultricies. Vestibulum id pretium neque. Nam ante arcu, fermentum et scelerisque.

yeild / investment / 3 / 1071

Fiscal: For graph and text, but explain blip

Vestibulum sapien...... lectus. Pellentesque euismod nec massa vel tincidunt. Aenean in nibh ante. Sed in ullamcorper arcu. Praesent viverra rutrum magna. Praesent placerat leo mollis orci euismod lacinia ut id libero. Morbi eleifend velit in consequat hendrerit. Nunc sit amet eros eu neque sollicitudin vehicula. In sem velit, commodo in porta a, euismod scelerisque augue. Donec condimentum imperdiet justo eget rhoncus. Suspendisse vitae quam at justo ornare sollicitudin. Nunc aliquet, ante vitae volutpat dictum, urna turpis venenatis tortor, at fringilla tellus mauris non tellus.

Marking

3/10

0/5 Style

5 = polished
3 = reasonable, with only a few stylistic gaffes
0 = ungrammatical throughout

[ ] General comment for criterion

3/5 Fiscal

Must show financial performance over time and discuss reasons

[ ] General comment for criterion

[3] For graph and text, but explain blip [X]

| s1 | s2 | s3 | s4 | s5 | s6 | s7 | s8 | s9 | s10 | s11 |
|---|---|---|---|---|---|---|---|---|---|---|
| 10% | 83% | 65% | -- | 0% | 10% | 73% | 33% | -- | -- | -- |

| s1 | s2 | s3 | s4 | s5 | s6 | s7 | s8 | s9 | s10 | s11 |
|---|---|---|---|---|---|---|---|---|---|---|
| 10% | 83% | 65% | -- | 0% | 10% | 73% | 33% | -- | -- | -- |

1100

| s1 | s2 | s3 | s4 | s5 | s6 | s7 | s8 | s9 | s10 | s11 |
|---|---|---|---|---|---|---|---|---|---|---|
| 10% | 83% | 65% | -- | 0% | 10% | 73% | 33% | -- | -- | -- |

| s4 | s9 | s9 | s10 | s11 | s5 | s1 | s6 | s8 | s7 | s2 |
|---|---|---|---|---|---|---|---|---|---|---|
| -- | -- | -- | -- | -- | 0% | 10% | 10% | 33% | 73% | 83% |

Figure 12a

| students / questions | s1 | s2 | s3 | s4 | s5 | s6 | s7 | s8 | s9 | s10 | s11 |
|---|---|---|---|---|---|---|---|---|---|---|---|
| Q1 | 20% | 25% | 65% | 30% | 80% | 15% | 65% | 45% | 5% | 50% | 40% |
| Q2 | 10% | 83% | 65% | -- | 0% | 10% | 73% | 33% | -- | -- | -- |
| Q3 | -- | -- | -- | -- | -- | 0% | -- | -- | -- | -- | -- |

| totals for students | | | | | | | | | | | |
|---|---|---|---|---|---|---|---|---|---|---|---|
| Total | 15% | 66% | 33% | 10% | 27% | 8% | 47% | 27% | 2% | 17% | 13% |

| marking | feedback | model answer |

-/25  [🏳 Flag] ←—1300

-/10 Topography
One mark per pertinent fact for major aspects of topography, eg terrain, river(s), mountainside(s)

Figure 13a

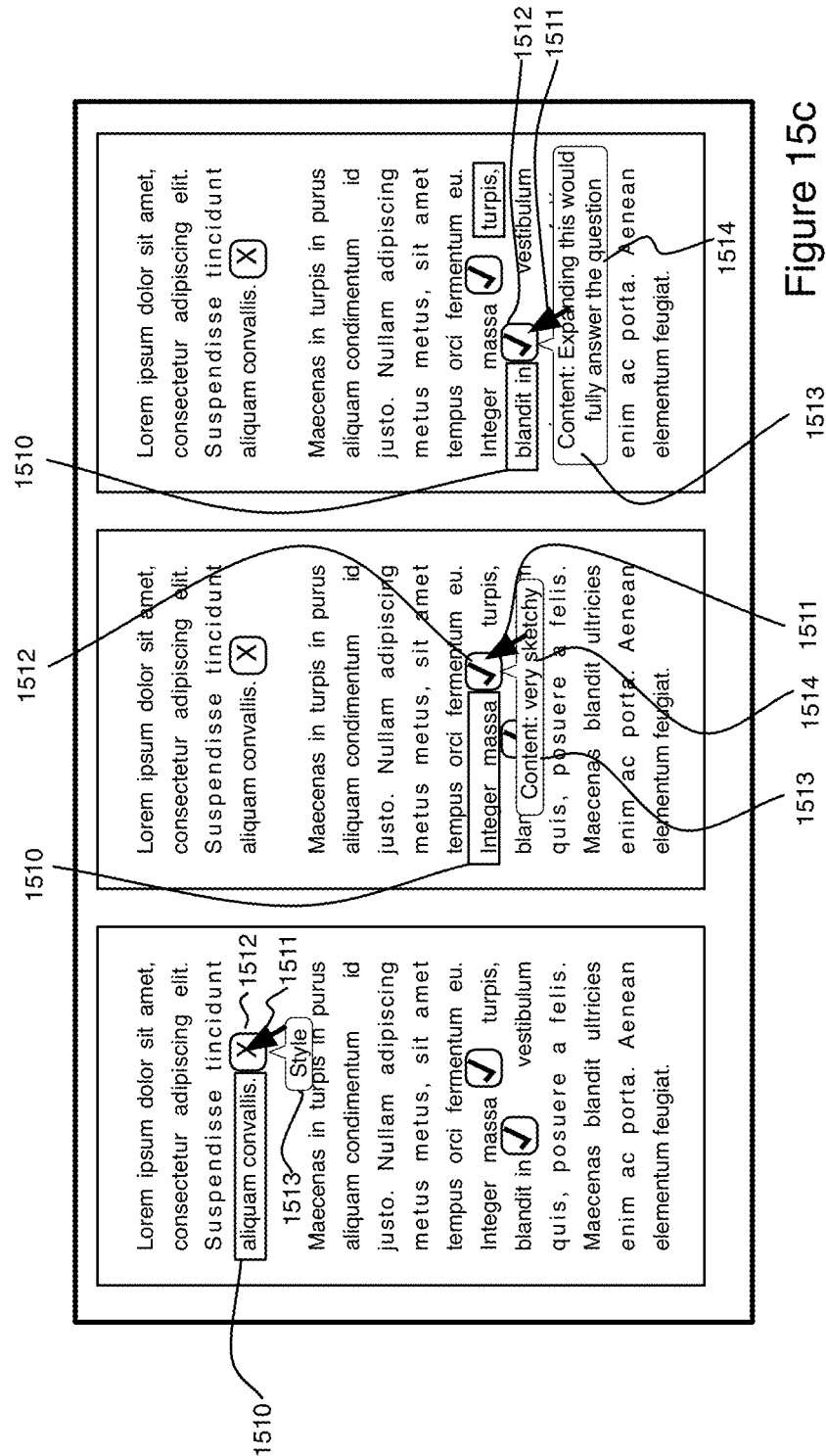

METHOD AND SYSTEM FOR MANAGING ASSESSMENTS

This application is based on and claims the benefit from U.S. Provisional Application No. 61/876,487 filed on Sep. 11, 2013, the entire content of which is hereby incorporated by reference.

FIELD OF INVENTION

The present invention is in the field of assessment management. More particularly, but not exclusively, the present invention relates to a computer-implemented method and system for managing the grading or marking of assessments.

BACKGROUND

Assessments are used to augment a training environment and/or to determine the competencies of students.

Assessments generally comprise one or more questions. Questions may require from students essay answers, short answers, or multi-choice selection. For some types of questions or assessments, answers provided as a mark-up on a drawing or diagram are required, a diagram or drawing itself is required, the working for an answer is required, or computer code is required.

A system for managing assessments is desirably one which ensures consistency amongst assessment scores and provides for effective feedback to students.

Traditionally assessments were marked in accordance with a marking guide developed for that assessment. This method in combination with sampling the assessments helped in part to improve consistency amongst the scores.

With paper-based assessments, marks or comments may be provided by the marker or grader within the answers, along the margins, or only at the end of the assessment within a marking/feedback appendix.

With the advent of widespread computer uptake by teaching bodies such as schools and universities, and within companies and training organisations, the management and processing of assessments can be undertaken, at least in part, by computers.

The advantages of computer-based systems include reduced paper management and improved collection of answers and grades.

Some existing computer-based systems provide for the allocation of marks in accordance with a marking guide, and some provide for the embedding of marks within student answers.

However, existing systems suffer disadvantages in ensuring consistency in marking across student answers and providing useful feedback to students.

Therefore, there is a desire for an improved computer-implemented assessment management system.

It is an object of the present invention to provide a method and system for assessment management which overcomes the disadvantages of the prior art, or at least provides a useful alternative.

SUMMARY OF INVENTION

According to a first aspect of the invention there is provided a method of managing an assessment, including a method of marking the assessment, the method including: selecting a portion or position in an answer to a question of one or more questions within an assessment in response to a first user input; assigning a grade and/or feedback to the selected portion in response to a second user input; and associating the grade and/or feedback to one of a plurality of criteria in response to a third user input.

According to a further aspect of the invention there is provided a method of managing an assessment, the method including: displaying within a table indications determined from any currently assigned grades for one question for a plurality of students for the assessment; receiving input from a user to select an indication; displaying the answer and assigned grade associated with the selected indication; and receiving input from the user to modify the assigned grade.

According to a further aspect of the invention there is provided a method of managing an assessment, including: displaying within a grid indications determined from any currently assigned grades for a plurality of students across a plurality of questions for the assessment; receiving input from a user to select an indication; displaying the answer and assigned grade associated with the selected indication; and receiving input from the user to modify the assigned grade.

According to a further aspect of the invention there is provided a system for managing assessments, including: a processor configured to select a portion or position in an answer to a question of one or more questions within an assessment in response to a first user input, to assign a grade and/or feedback to the selected portion or position in response to a second user input and to associate the grade and/or feedback to one of a plurality of criteria in response to a third user input; and an input configured to receive input from a user.

According to a further aspect of the invention there is provided a system for managing assessments, including: a processor configured to display within a table indications determined from any currently assigned grades for one question for a plurality of students for an assessment and to display the answer and assigned grade associated with a selected indication; and an input configured to receive input from a user to select an indication and to modify an assigned grade.

According to a further aspect of the invention there is provided a system for managing assessments, including: a processor configured to display within a grid indications determined from any currently assigned grades for a plurality of students across a plurality of questions for an assessment and to display the answer and assigned grade associated with a selected indication; and an input configured to receive input from a user to select an indication and to modify an assigned grade.

Other aspects of the invention are described within the claims.

BRIEF DESCRIPTION OF THE DRAWINGS

Embodiments of the invention will now be described, by way of example only, with reference to the accompanying drawings in which:

FIGS. 6a and 6b: show a user interface for defining an assessment in accordance with an embodiment of the invention;

FIGS. 7a to 7e: show a user interface for marking an assessment in accordance with an embodiment of the invention;

FIGS. 10a to 10k: show a user interface for marking answers for an assessment in accordance with an embodiment of the invention;

FIGS. 12a to 12e: show a user interface for displaying representations of grades for multiple questions for multiple students for an assessment in accordance with an embodiment of the invention;

FIGS. 13a to 13c: show a user interface illustrating the use of flags within a method of marking an assessment in accordance with an embodiment of the invention;

FIGS. 15a to 15e: show a user interface for displaying feedback from marking of an assessment to a student in accordance with an embodiment of the invention; and FIGS. 16a and 16b: show a user interface for displaying feedback in different views for an assessment in accordance with an embodiment of the invention.

DETAILED DESCRIPTION OF PREFERRED EMBODIMENTS

The present invention provides a computer-implemented method and system for managing assessments.

The terms mark and grade, marking and grading, and marker and grader will be used interchangeably within this document and will be understood to have the same meaning.

Figure 1:
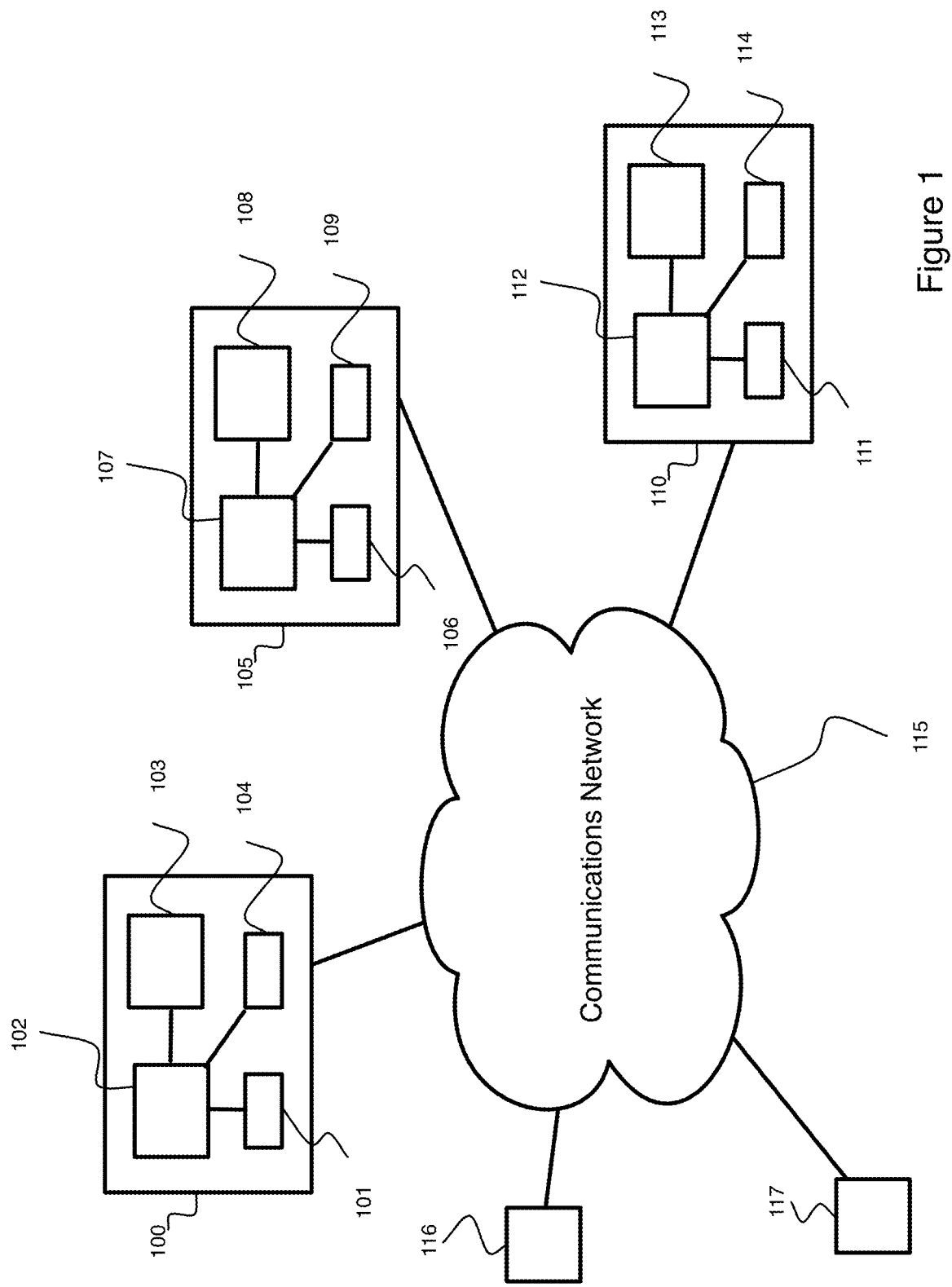
FIG. 1: shows a block diagram illustrating a system in accordance with an embodiment of the invention.

In FIG. 1, a system in accordance with an embodiment of the invention is shown.

A first user device 100 is shown. The first user device 100 may include a memory 101, a processor 102, an input 103 and a display 104.

A second user device 105 is shown. The second user device 105 may include a memory 106, a processor 107, an input 108 and a display 109.

A third user device 110 is shown. The third user device 110 may include a memory 111, a processor 112, an input 113 and a display 114.

A communications network 115 is shown. The communications network 115 may comprise a plurality of networks such as the Internet, or it may be a local area network (LAN) or wide area network (WAN).

A server 116 is also shown. The server 116 may be a web server and configured to communicate with the user devices 100, 105, and/or 110 by providing code for execution on web browsers or thin clients on the user devices 100, 105, and/or 110 and receiving inputs from the user device via the web browser or thin client.

A database 117 is shown. The database may be configured for storing assessments, answers to assessments, and graded answers.

In one embodiment, the user devices 100, 105 and/or 110 may be configured to communicate with the database via the communications network 115.

In one embodiment, the first user device 100 is configured to receive input from a user, via the input 103, to define questions for an assessment and to assign one or more criteria to each of the questions. The first user device 100 may be configured in such a way by software stored in memory 101 or the first user device 100 may be configured in conjunction with the server 116. The first user device 100 may be configured to store the questions and criteria assignments in the database 117.

In one embodiment, the second user device 105 is configured to select a portion or position in an answer to a question of one or more questions within an assessment in response to a user via the input 108, to assign a grade and/or feedback to that portion or position in response to the user via the input 108 and to associate the grade and/or feedback to one of a plurality of criteria in response to the user via the input 108. The second user device 105 may be configured in such a way by software stored in memory 106 or the second user device 105 may be configured in conjunction with the server 116. The second user device 105 may be configured to retrieve the answers from the database 117, and to store the grades and/or feedback and criteria associations in the database 117. The plurality of criteria within which the grade and/or feedback may be associated may be those criteria assigned to the relevant question by user device 100.

In one embodiment, the third user device 110 is configured to display, on the display 114, an answer to a question within an assessment to the student where one or more portions of the answer are associated with a grade and/or feedback, to receive input from the student, via the input 113, to select either one of the portions of the answer or a grade and/or feedback associated with the answer and to indicate, on the display 114, the associated portion or grade and/or feedback in response to the input. The third user device 110 may be configured in such a way by software stored in memory 111 or the third user device 110 may be configured in conjunction with the server 116. The third user device 110 may be configured to retrieve the answers and portion to grade/feedback associations from the database 117.

The first, second and/or third user devices 100, 105, and 110 may be the same user device.

It will be appreciated that the functions of the system of the invention may be deployed across one or more computing and communications systems, such as within a cloud-based architecture.

A method of managing an assessment, including a method 200 for defining an assessment, in accordance with an embodiment of the invention will now be described with reference to FIG. 2.

In step 201, input is received from a user (the assessment setter) to define one or more questions for the assessment. An input box may be provided within a graphical user interface to receive the input from the user. Alternate mechanisms of receiving input are envisaged including importation of text documents or graphic files.

In step 202, input is received from the user to assign one or more criteria to each of the questions. A plurality of possible criteria may be displayed to the user for selection. An input box may be provided to permit free entry of new criteria by the user.

Steps 201 and/or 202 may be repeated for questions already entered to which criteria have already been assigned as an iterative process to enable the user to refine the question definitions and/or reconsider the criteria assigned.

A method of managing an assessment, including a method 300 for grading/marking answers to an assessment, in accordance with an embodiment of the invention will now be described in relation to FIG. 3.

Figure 2:
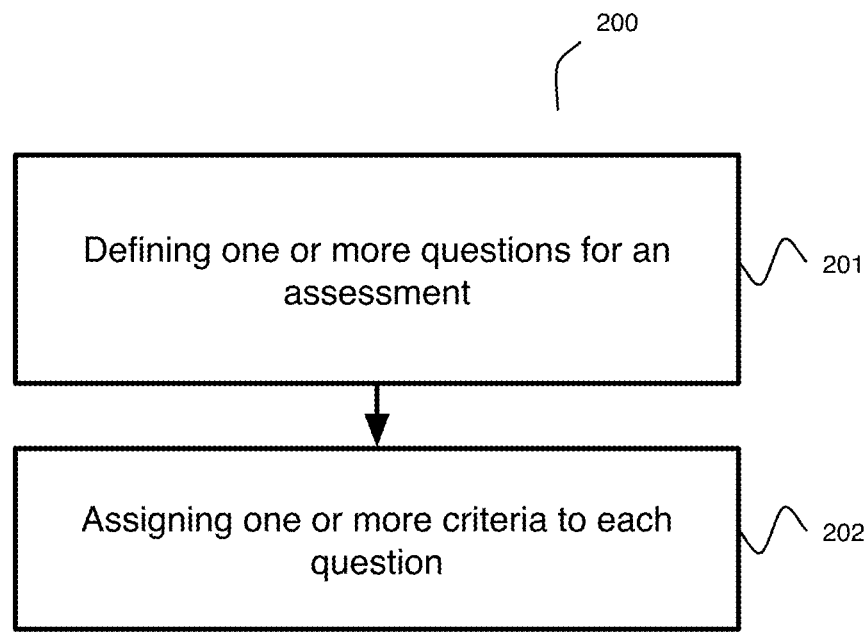
FIG. 2: shows a flowchart illustrating an assessment definition method in accordance with an embodiment of the invention.

The assessment may comprise one or more questions and may have been defined during the method described in relation to FIG. 2. Answers may have been provided to the questions by one or more students using a computing device.

In step 301, a portion of an answer to a question is selected by a user via a user interface, such as a graphical user interface. The answer may be displayed within the interface, and input from the user such as pointer-based input may be used to define the portion of the answer, for example, by sweeping text within the answer (i.e. clicking a pointer-based device and dragging over the text), by clicking or double clicking a word, sentence, or paragraph, by defining a rectangle, or by defining an outline using a pointer-based interface. It will be appreciated that touch-based interfaces may also be used. For example, selection of the portion may be made by touching and dragging a finger over the portion or around the portion.

In an alternate embodiment, instead of a portion being selected, a position within the answer is selected. For example, by clicking at an x, y coordinate within the displayed answer.

In step 302, a grade and/or feedback may be provided by the user via a user interface, such as the graphical user interface, for that portion (or position) of the answer. A modal input window may be displayed once the portion (or position) is selected in step 301. The input window may comprise one or more input boxes, radio buttons, drop-down selection menus, or other input widgets. In one embodiment, an input widget provides for free-form entry of feedback.

In step 303, the grade and/or feedback may be associated with one of a plurality of criteria. The criteria may be displayed within the input window along with the input widgets for the grade and/or feedback. The criteria may be selectable by the user as buttons or a drop-down menu. It will be appreciated that other mechanisms could be envisaged. The plurality of criteria may be those assigned to the question during the method of defining the assessment described in FIG. 2.

In step 304, an anchor associated with the grade and/or feedback may be displayed within the answer. The anchor may be a representation of the grade assigned to that portion (or position). For example, it may be a box containing the grade. The anchor may displayed proximate to the portion (or position). For example, to the left or bottom-left of the portion, or at the position. Other orientations with respect to the portion can be envisaged.

In step 305, the portion (or position) of the answer associated with the grade and/or feedback may be indicated when the anchor is actuated. The anchor may be actuated when "moused-over" within a pointer-based interface or touched within a touch-based interface. Alternative methods of actuation such as clicking, double-clicking, or double touch are also possible. The portion may be indicated by highlighting the portion of the answer, for example, by surrounding the portion with a rectangle or by changing visual characteristics of the portion, for example, by changing the colour or background colour of text of the portion.

It will be appreciated that the steps above may not necessarily be performed sequentially as described. For example, step 302 of providing a grade and/or feedback may occur before the portion is selected in step 301, or step 303 of associating a criterion may occur before the grade and/or feedback has been assigned in step 302.

Figure 4:
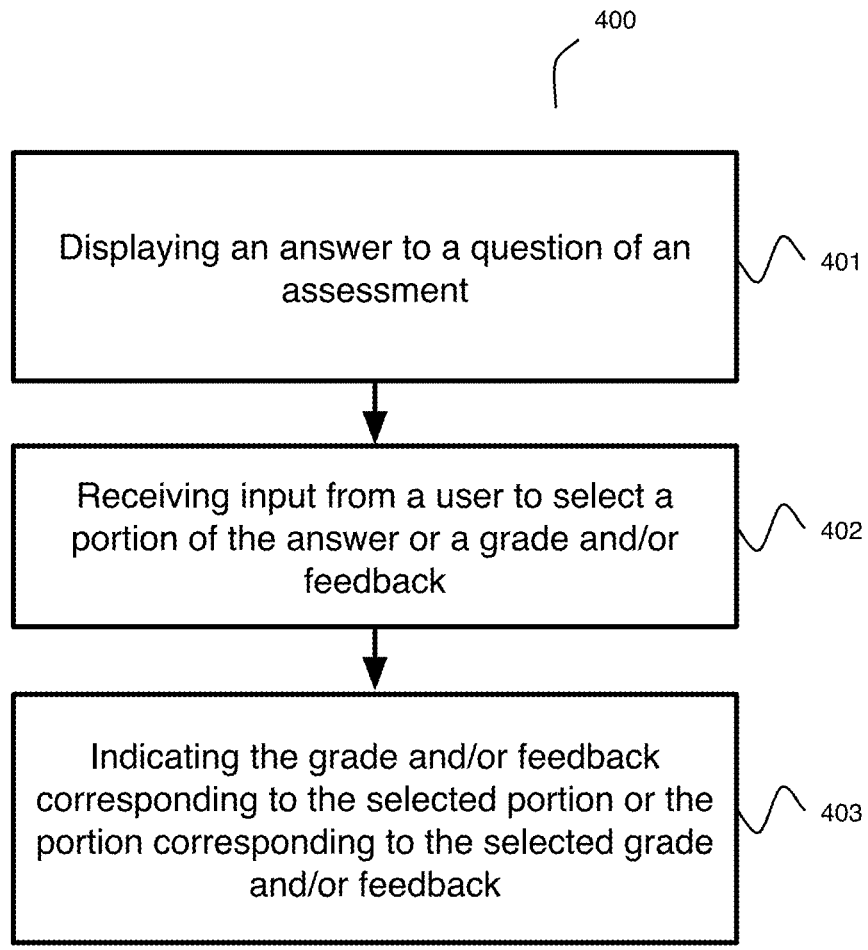
FIG. 4: shows a flowchart illustrating a feedback method in accordance with an embodiment of the invention.

A method of managing an assessment, including a method 400 for providing feedback to a student, in accordance with an embodiment of the invention will now be described in relation to FIG. 4.

Figure 3:
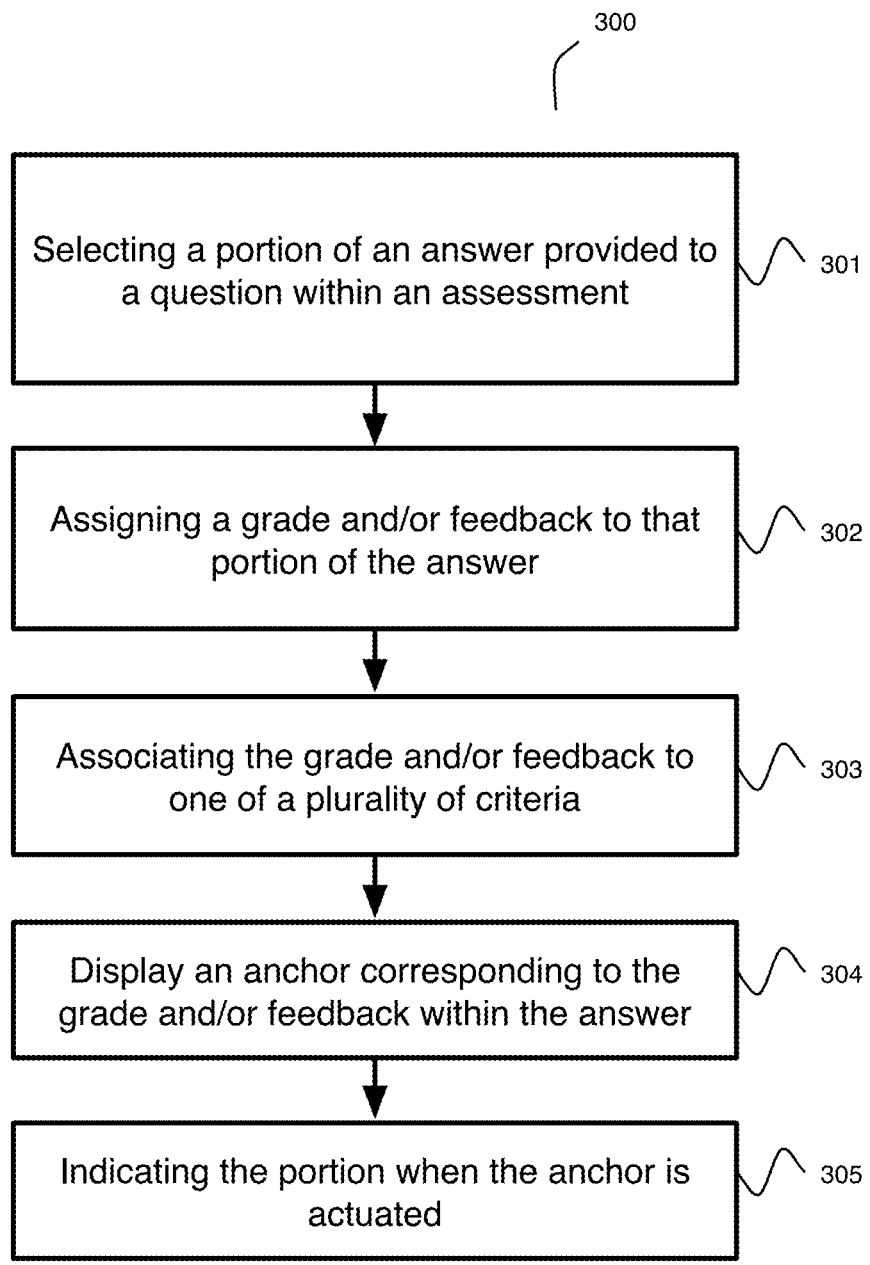
FIG. 3: shows a flowchart illustrating a marking method in accordance with an embodiment of the invention.

The assessment may comprise one or more questions to which answers have been provided by the student and which have been graded/marked in accordance with the method described in relation to FIG. 3.

In step 401, the answer to a question within the assessment is displayed to the student via a user interface. Grades and/or feedback relating to the answer may also be displayed. The answer may be displayed within one panel and the grades and/or feedback may be displayed in another panel. One or more anchors may be displayed within the answer, each anchor associated with a grade and/or feedback.

In step 402, input is received from the student via the user interface to select either a portion of the answer or a grade and/or feedback. The portion of the answer may be selected, for example, by mousing-over over an anchor displayed within the answer. The grade and/or feedback may be selected, for example, by mousing-over the displayed grade and/or feedback in the panel or a section of the panel comprising the grade and/or feedback.

In step 403, the portion or grade and/or feedback corresponding to the selected grade and/or feedback or portion may be indicated. For example, where the portion is selected, the grade and/or feedback may be highlighted within the panel or displayed within the user interface, and where the grade and/or feedback is selected within the panel, the portion may be highlighted, for example, by changing a visual characteristic of the portion.

A description of one or more embodiments of the invention will now be described with reference to FIGS. 5a to 16b.

In the following description, the following definitions will be used:

An assessment may have one of more questions.

One or more students take the assessment by answering the questions.

An answer is a student's response to a particular question in the assignment. If a student provides no response to a question, the answer still exists, but is empty. For an assessment of q questions taken by s students, there are q×s answers.

Each question may have a rubric, sometimes called a marking or grading scheme.

When grading an assignment the notion of a record of what to assign grades for is common. This is called a rubric.

Each rubric contains one or more criteria, guides as to levels of student performance on each criterion, grades for given levels of performance, and may contain other information.

The other information a rubric may carry could be a short-form name, a description, a model answer, significant definitions or examples that might appear in an answer. In short anything that helps a grader perform his or her tasks to a particular standard. Sometimes a rubric is made available to students to help guide their formation of an answer, in such a case information like the model answer is likely omitted.

Each criterion is concerned with an area of knowledge or area of performance that students should demonstrate in their answer.

A model answer is an example answer at good or expert level for the class being assessed. It may assist the grader, as a source of comparative data when assessing an answer, or be supplied to students post-assessment to assist them understand what a good answer to the question might have been, and where they may have diverged from the desired standard of answer.

A positional entity is composed of
The part of the answer that the entity refers to
The criterion the positional entity is associated with
A grade and/or feedback Feedback is information (in text or another form, e.g. recorded spoken word, drawing) that gives the student information on his or her performance, and how he or she may improve that performance.

Uses for rubrics

When grading answers of more than trivial complexity, a guide as to how to allocate grades is essential. Grading sessions may extend over a long period of time, different answers may be graded by different people, and/or the same answer may be graded by two different people. In such cases, a rubric acts as a guide and reference to how grading should proceed, not only to help ensure accuracy in grading for single answers, but also to help ensure consistency in grading across answers to a question. In this, the criteria and the rubrics are of essence, and help assure grade accuracy and internal consistency of grades across different answers.

Particularly when moderation is concerned (double grading, or use in exam boards to ensure grading is of satisfactory standard) traceability of grades is of assistance. By traceability one should be able to see what grades were assigned to what criteria, where they were assigned in the text of the answer, an, by a process of examination, if that part of the answer is worth the grades assigned. In this, positional grades (that are associated with part of an answer or a particular place in the answer) are of great merit.

A rubric is also of use to students, not only before answering questions, to guide the student's formation of the answer, but also after grading to see what parts of the answer contributed to grades gained under different criteria, Feedback to students can also usefully be categorised under criteria, and again it is of use to moderators and students to see the criterion pertaining to each item of feedback. Feedback may be of three kinds, I feedback for the whole answer, feedback for each criterion, and positional feedback on particular parts of the answer.

1 Positional feedback and criteria: description and UML

The data structures used within this embodiment of the invention will now be described with reference to FIGS. 5a to 5d.

Figure 5A:
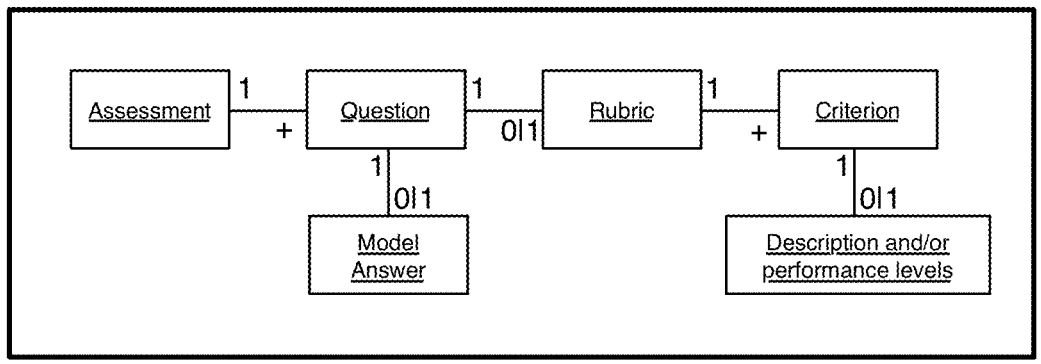
FIGS. 5*a* to 5*d*: show a block diagram illustrating UML class diagrams defining data structures for use with an embodiment of the invention.

FIG. 5a shows a Uniform Modelling Language (UML) class diagram for this embodiment, showing assessment with one or more questions, each question has an optional rubric and an optional model answer. For a rubric, there are one or more criteria, and each criterion has an optional definition and/or performance levels associated with it.

Figure 5B:
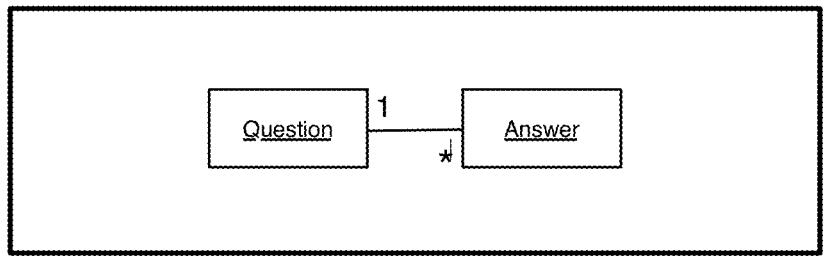

FIG. 5b shows a UML class diagram for answered questions. Each question has several answers. Each answer, for a given question, is supplied by a different person who has completed the assessment tasks. That answer may be empty or it may have text and/or image content. Manifestations of the answer may be plain text, or formatted text, possibly with graphics or anything which may be displayed on a computer screen from a stored representation.

Figure 5C:
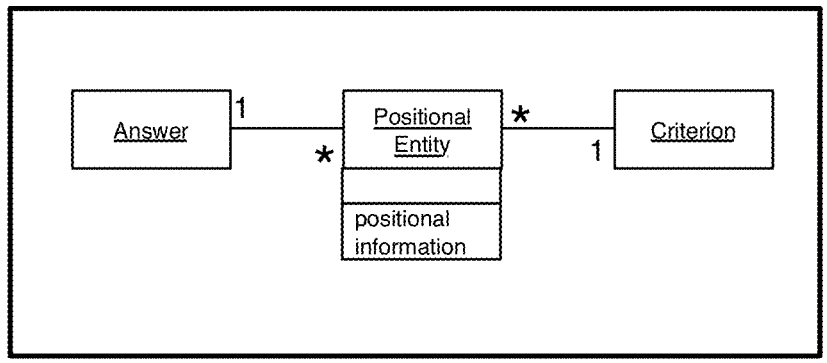
Figure 5D:
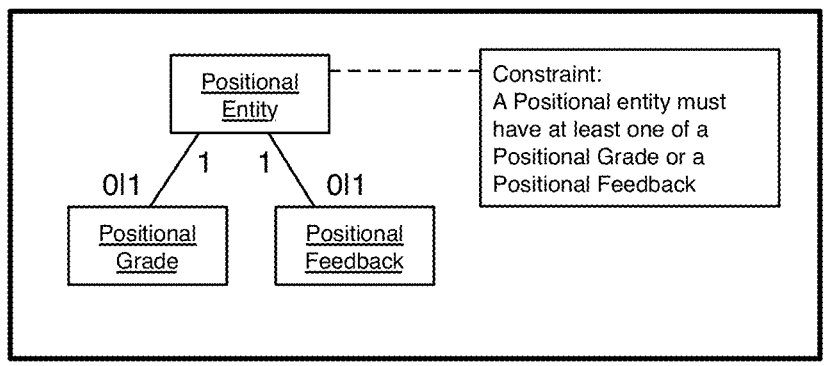

FIGS. 5c and 5d shows UML class diagrams for marked answers. A position in an answer or a part of an answer may be associated with a grade expressed numerically or a recorded speech, video or textual comment providing feedback to the student. These are called positional entities within this embodiment.

A position in an answer may be a place or Cartesian co-ordinate defined point, or a character position, or a string of contiguous text which possibly contains one or more paragraphs titles or parts thereof, or any other definition of a part of an answer.

FIG. 5d shows how positional entities may have their position recorded in a variety of ways using one or more indexes into the text in an answer, or one or more xy coordinate pairs.

FIG. 5c shows that the positional entity is associated with one criterion, and a criterion may be associated with zero or more positional entities.

2 Positional feedback and criteria: Advantages in marking

In grading, the person grading (the grader) is interested in
Assigning grades and creating feedback
Increasing grade accuracy. Grade accuracy is the extent to which the grade allocated reflects the quality of the answer. For each answer the process of improving mark accuracy is to examine how marks have been allocated, with a view to improving the allocation that has gone before.
Perforce this involves finding answers to examine for grade accuracy, and examining the answer and grades assigned.
Improving feedback so it can lead to student improvement, feedback review includes making sure it is consistent with answers (and the lack of requisite content in answers), and the grades assigned.
Increasing internal grade consistency. This is the extent to which grades have been allocated in the same way across different answers to the same question.
Perforce this involves finding answers to compare, and examining and comparing answers and the grades provided. Grades already assigned are very useful in finding answers to compare, often a marker will concentrate on the bottom and top graded answers, and answers graded near significant transitions, eg pass/fail transition grade level, normal/merit grade transition level In many of these improvement processes finding and use of marks and feedback assigned to criteria are important.

3 Setting: Creating a rubric containing criteria

The assessment comprising the questions and the rubric may be defined by a user utilising a user interface that will now be described in relation to FIGS. 6a and 6b.

Question text, question marks, model answer, criteria, criteria descriptions and criteria marks may be edited at any time in the user interface shown in FIGS. 6a and 6b. This allows them to be developed in parallel (e.g. when working on the rubric the question may needed to be amended to better reflect what is expected as expressed in the rubric).

To develop a rubric the edit rubric button 600 may be selected which will expand the rubric input panel.

The rubric input panel 601 may provide for input to enter a model answer and to add one or more criterion 602 associated with a criterion description 603 and a mark 604.

In an alternative embodiment, the rubric is developed separately from the question and attached to the question.

4 Marking

4.1 Parts of the Marker User Interface

After students have provided answers to the questions within the assessment, the answers, the questions, and the rubrics are provided within a user interface to a grader/marker for grading/marking.

FIG. 7a shows an example of marking/grading user interface. This interface comprises a student menu 700 to enable the user to select different student's answers to the same question, a question menu 701 to enable the user to select a question for marking, an answer panel 702 displaying an answer for the currently selected student and selected question, a marking panel 703 displaying the rubric for the selected question, and the selected question 704.

The interface enables the marker/grader to interact with the answer within the answer panel 702 to create positional entities associated with portions of the answer.

4.2 Positional entities in an answer

4.2.1 What positional entities depict

In the answer (within the answer panel) a positional entity is represented by a marker (called an anchor) that appears:

- In a fixed point in relation to some positionally selected text.
- as an area appearing at a particular positionally selected area on a pdf, scanned handwritten page, digital photograph or other visual representation.

The anchor:

- Shows any positional grade allocated to the positional entity.
- Positioning the cursor tip over (aka mousing over) the results in display of any positional feedback and the name of the criterion to which positional entity contributes Moving the mouse away from the anchor hides that information.

The use of positional entities (connecting selected portion of the answer to specific grades and/or feedback) which are assigned to criterion may provide the following advantages:

1) It assists a grader to achieve greater grade accuracy and greater internal consistency of grades across different answers to the same question. Specifically there is a guide to how marks should be allocated in the rubric, and once allocated, the grader can see how and to which criterion marks were allocated aiding the continuing process of assessment of and revision of how grades are allocated.
2) A moderator of the assessment is able to understand how and what marks were allocated for.
3) Students can observe how grades were allocated and thereby are able to see where they did well and where they did badly within an answers, so as to understand and improve their performance.

4.2.2 User creation of positional entities in the answer

Step 1: obtain a selection

The following illustrate different exemplary methods for a user to select portions of the answer (text-based answers or non-solely text-based answers) to create positional entities:

Specify a selection area in text: method 1: Sweep text

Figure 7B:
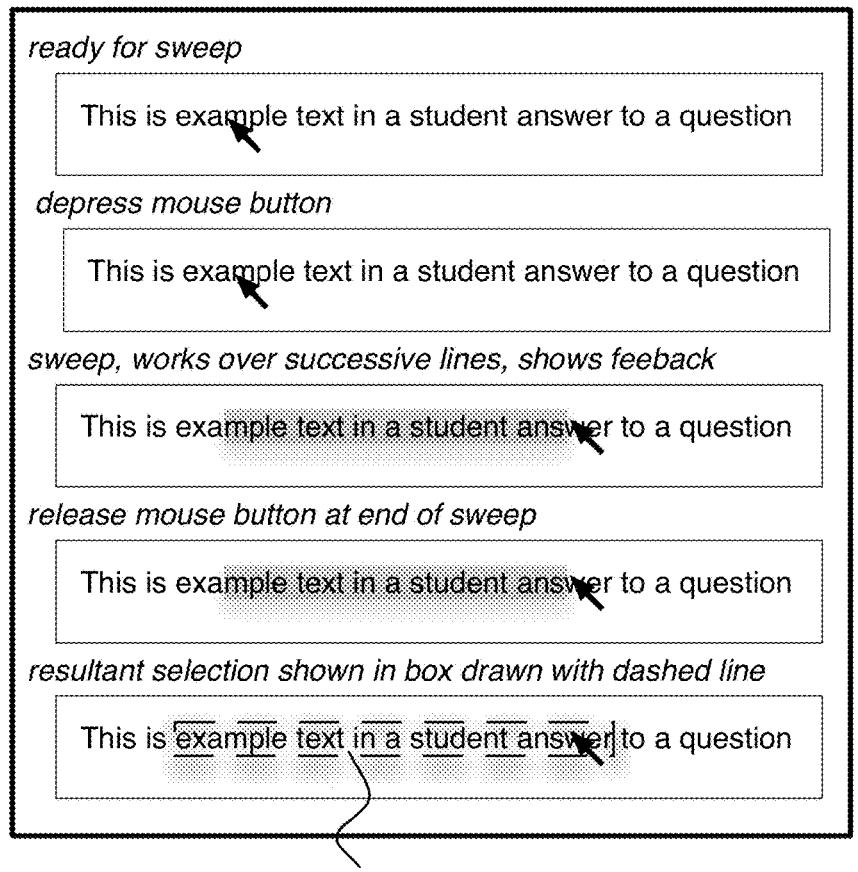

FIG. 7b shows the selection of a portion of the answer using a sweep text method. The user holds the left mouse button down and sweeps over the text. Text selected 710 is aligned with start/end of words containing start/end of sweep. This method can operate over selection in one line, or multiple lines, be those multiple lines in one or more paragraphs.

The align-to-word mechanism is preferred, however the method described above could also work without alignment to word boundaries. As shown in the diagram at ('mple i a student ans').

Specify a selection area in text: method 2: Double click on a word

Specify a selection area in an image, for example: method 1: Sweep out a rectangle or other regular shape This selection method may be applied to scans, digital photographs, web pages, and laid pages e.g. PDFs, diagrams and drawings, or anything that can be represented on a computer screen.

Specify a selection area in an image: method 2: Draw an outline

It will be appreciated that the above methods describe different user interfaces to enable a user to calibrate selection of a portion of an answer, and that similar methods may also be used.

Step 2: Fill in dialogue box

A dialogue box is displayed immediately after a selection has been made.

Figure 7C:
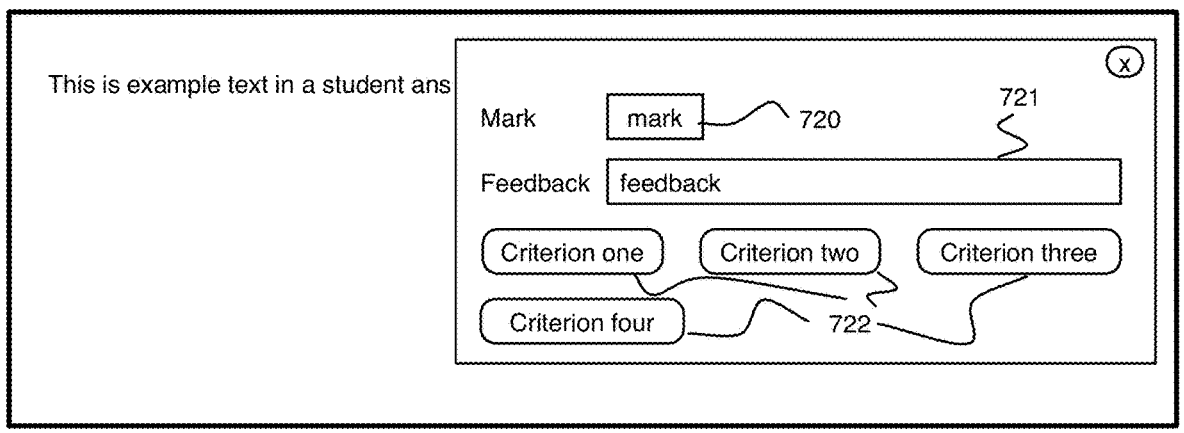

Show dialogue box for positional grade and/or positional feedback, and assignment to criterion FIG. 7c shows a dialogue box. The user fills in one or both of the grade 720 and feedback 721 fields, and then selects a criterion by clicking a button 722 labelled with that criterion name Clicking a criterion button makes the dialogue box disappear, makes positional information appear in the answer, and creates a grade/feedback entry appear under the criterion in the marking panel.

Clicking on a criterion button provides a convenience; the dialogue box could also be a radio button scheme for criteria and an OK and CANCEL buttons. Creating positional entities marks and/or feedback includes as a constituent part a selection of a criterion to assign the positional entity to.

Reuse and personalization of feedback

Graders can spend considerable time entering feedback for students, the ability to select existing feedback may be a useful time saver, particularly if it can be easily edited and personalized address particular student needs.

Figure 7D:
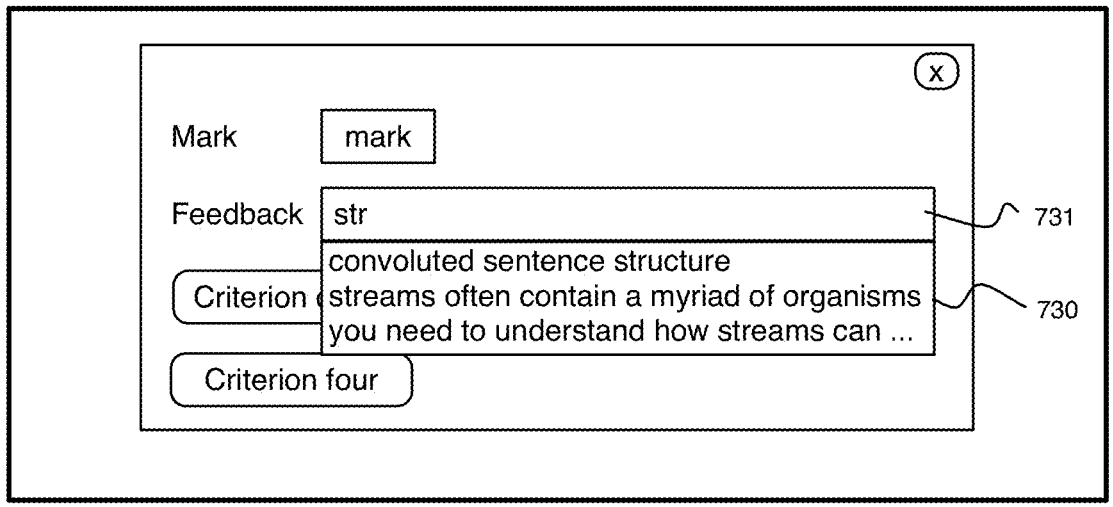

In one embodiment, a drop-down menu 730 may be used to select previous feedback for use as shown in FIG. 7d. Typing any string in the feedback field 731 results in previous feedback containing that string being shown in the drop-down menu. With each new character typed the contents of the menu 730 may change.

Various schemes are possible; the basic scheme is to use all feedback entered for an assessment as candidates for display in the dropdown menu.

Enhancement: entering grades with buttons

Figure 7E:
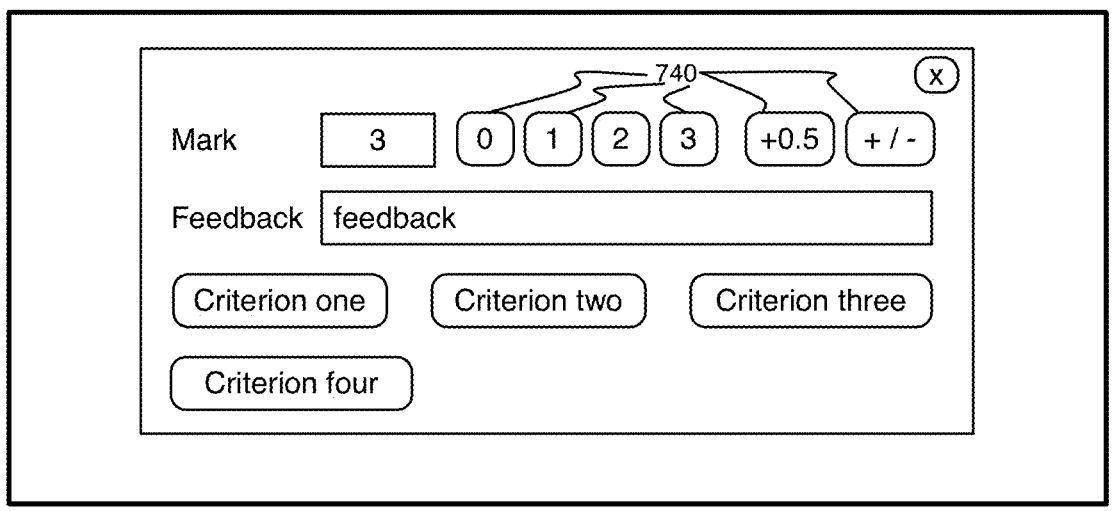

In order to help avoid hand movements between mouse and keyboard, a variant of the dialogue box includes buttons 740 for marks as shown in FIG. 7e.

4.2.3 Automatic creation of an anchor in the answer and appearance and behaviour After a positional entity has been created (by clicking on a criterion button) and assigned to a positional indicator an anchor appears. Anchors have a visual and positional representation and interactive behaviours that, for each anchor, allow access to information about the positional entity represented by an anchor.

The appearance and behaviour of anchors in answer text and images is discussed below.

Appearance and behaviour of positional entities in the answer

An anchor represents the positional entity in the answer. The anchor is created after the dialogue box is closed.

In text

Figure 8A:
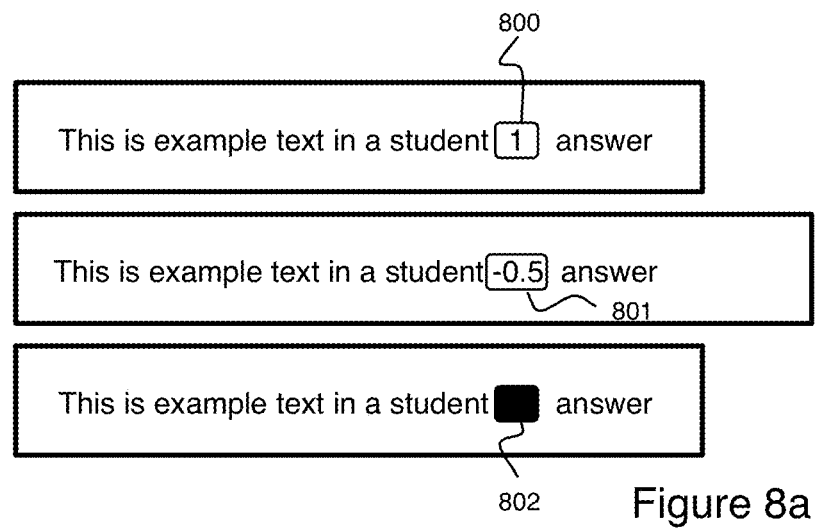
FIGS. 8a to 8g: show a user interface for displaying and interacting with anchors within text answers for an assessment in accordance with an embodiment of the invention.

If a mark was assigned the mark may appear in an anchor 800, 801, or 802 as shown in three examples in FIG. 8*a*; the mark may be positive or negative and may be a whole number or a fraction. Different colours may be used to differentiate positive (green) and negative (red) marks, or gray if no mark is assigned.

Figure 8B:
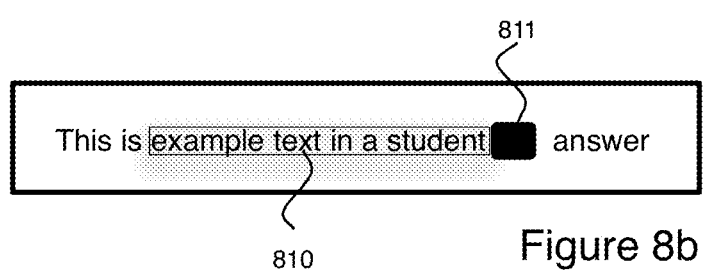
Figure 8C:
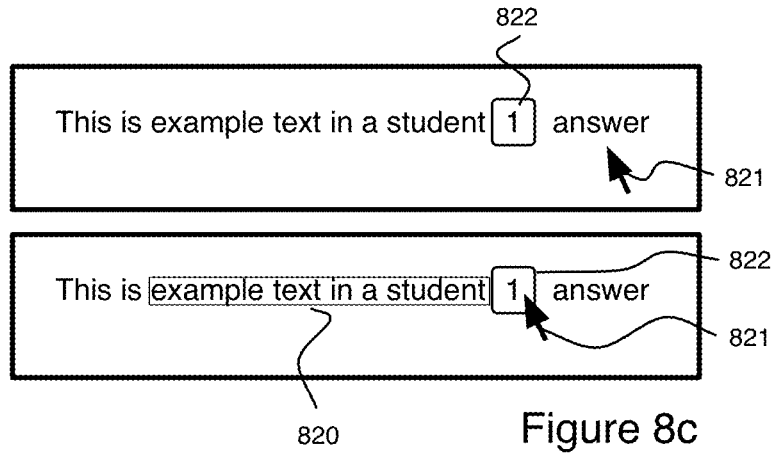

In one embodiment, the selected area 810 (i.e. the portion of the answer to which the anchor 811 applies) may also be displayed with a marker such as highlighting the portion 810 as shown in FIG. 8*b*.

Alternatively, a more sophisticated scheme may be used to allow easy detection of text associated with position entities where the text overlaps. The basis for this is that the highlight 820 is only shown when the cursor 821 is positioned over an anchor 822. Thus, a normal appearance is presented with no highlight, and the highlight 822 appears when the cursor 821 is held over the anchor 820 as illustrated within FIG. 8*c*.

Figure 8D:
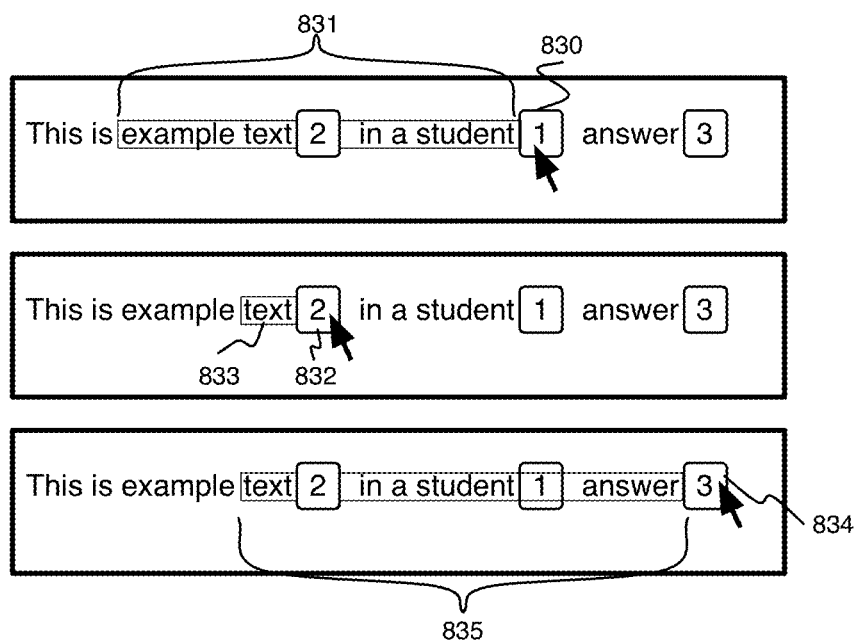

The advantage to this scheme is readily apparent when selected areas overlap, if a further anchor is added with overlapping positionality, its positional text can be readily discerned as shown in FIG. 8*d*. In FIG. 8*d*, actuation of anchor 831 highlights portion 830, actuation of anchor 832 highlights portion 833, and actuation of anchor 834 highlights portion 835.

Figure 8E:
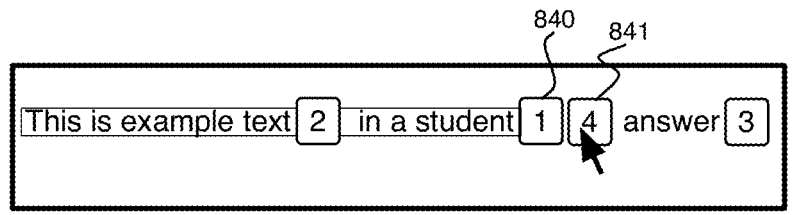

If anchors are associated with text that ends (at the right hand side) at the same word boundary, anchors 840 and 841 appear next to each other as shown in FIG. 8*e*.

Figure 8F:
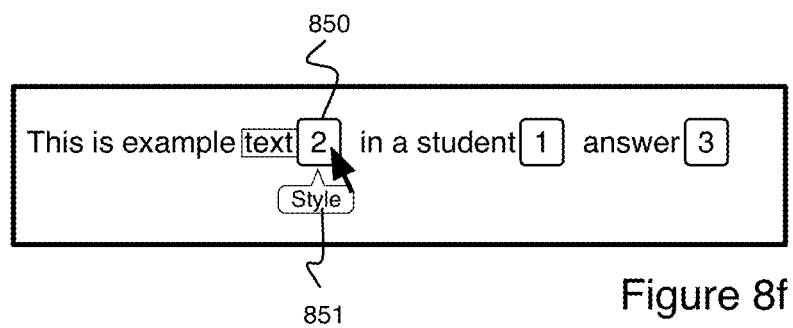

Moving the cursor over an anchor 850 may display the criterion 851 the positional entity belongs to within a hover box 851 that is displayed while the cursor remains over the anchor 850 as shown in FIG. 8*f*.

The positional information may not be the only information displayed in this way: When selection feedback is displayed for an anchor which denotes a positional entity, the criterion associated with the positional entity is displayed in a hover box.

Figure 8G:
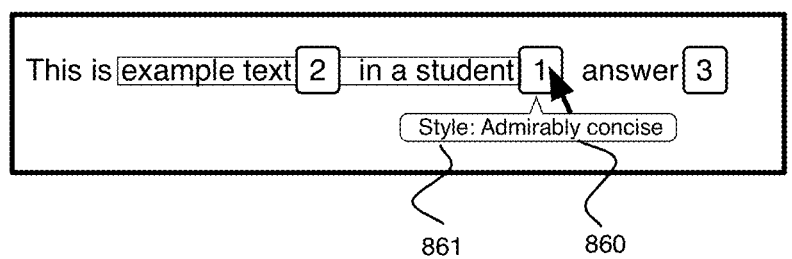

Any positional feedback 860 associated with the positional entity may also displayed, after the criterion 861 as shown in FIG. 8*g*.

One potential advantage of the above methods is that information associated with the positional entity is displayed in context so that the user does not need to look elsewhere within the display.

In images

Anchors behave similarly in images except that the feedback is for a swept out area, and the anchor appears at the bottom right of the swept area (it will be appreciated that a different position for images anchors may be configured). Overlap of positioned area for different overlapping areas is dealt with similarly as in FIG. 8*d*, by showing the area when the cursor tip is over the anchor.

Figure 9A:
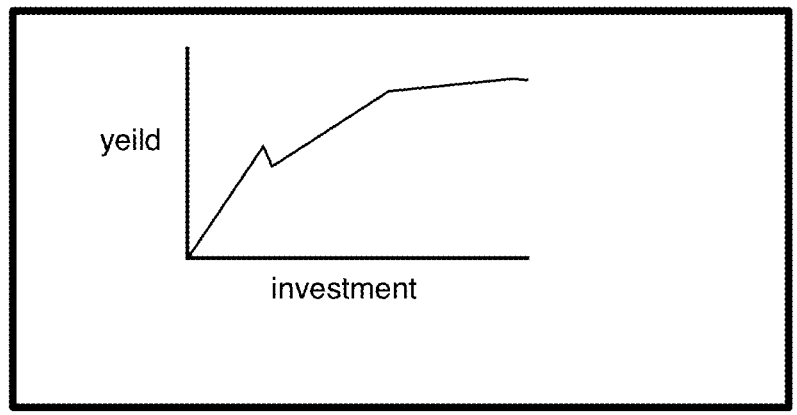
FIGS. 9a to 9e: show a user interface for displaying and interacting with anchors within image answers for an assessment in accordance with an embodiment of the invention.

As an example, in FIG. 9*a*, the graph appears in an answer.

Figure 9B:
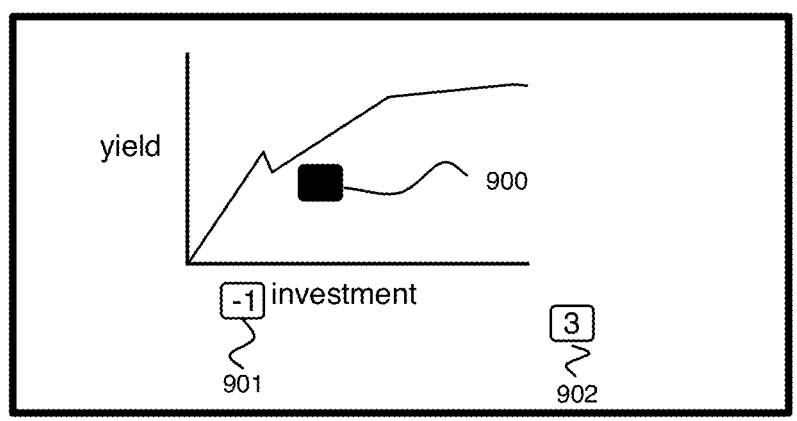

After marking three anchors 900, 901, and 902 are displayed as in FIG. 9*b*.

Figure 9C:
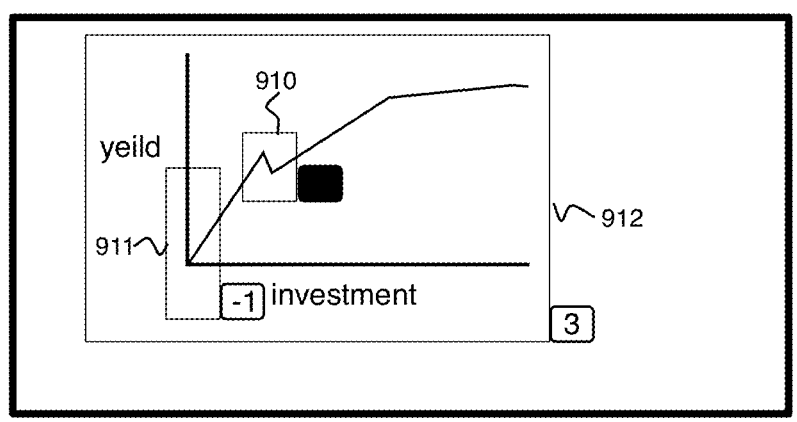

FIG. 9*c* shows how positional information overlaps, together with the areas associated with anchors 910 with 900, 911 with 901, and 912 with 902.

In the answer, when the cursor is not over any of the three anchors no criteria or feedback are shown as in FIG. 9*a*.

Figure 9D:
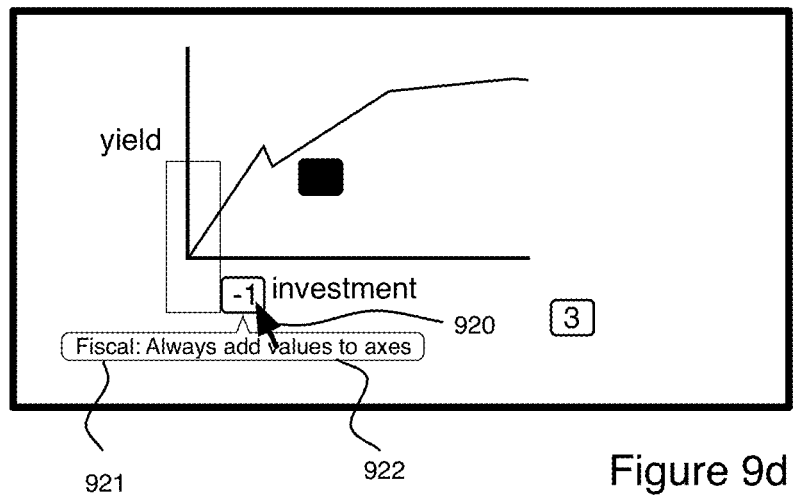

When the cursor tip 920 is over an anchor 901 the associated criterion 921 and feedback 922 are shown as in FIG. 9*d*.

Figure 9E:
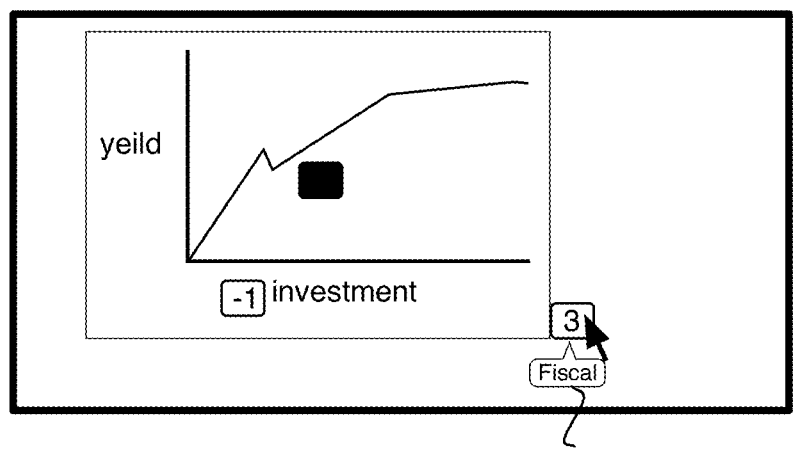

When there is no feedback for a positional entity, only the criterion 930 is shown in the hover box as in FIG. 9*e*.

4.3 Positional Entities in the Marking Panel

FIG. 10*a* shows a marking panel showing non-positional associated grades and feedback classified under criteria.

4.3.1 Layout of the grading panel

FIG. 10*b* shows a panel configured for scrolling to cope with the space demands of multiple criteria and multiple positional entities.

4.3.2 Positional entities appear under criteria

In the example, shown in FIG. 10*c*, two positional entities 1000 and 1001 appear under the second criterion 1002. Each entry shows a positional mark 1003 and 1004 and/or positional feedback 1005 and 1006, and the portions 1007 and 1008 of the answer associated with the positional mark and/or feedback.

Figure 10D:
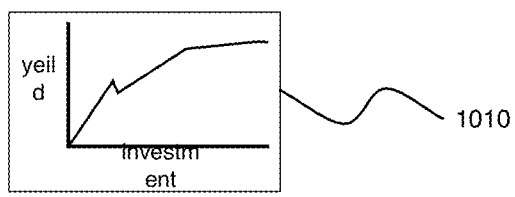

For positional entities that describe parts of images, an image fragment 1010 appears in the marking panel as shown in FIG. 10*d*.

Clicking on the image fragment 1010 displays it full size in an overlaid light-box (not shown in the Figure).

4.3.3 Entries may be created automatically

Positional entity entries may be created automatically under the appropriate criterion when an anchor is created in the answer.

4.3.4 Information in a positional entity in the marking panel

Positional entities are shown in the marking panel, under their associated criterion in the rubric.

The information a positional entities carries is:

By positioning, under a criterion shows the criterion the positional entity applies to.

One or both of a mark and a feedback comment

The general form of the positional entity comprising the mark 1020 and feedback comment 1021 is shown in FIG. 10*e*.

Examples of mark only 1030, feedback only 1031 and mark and feedback use 1032 are shown in FIG. 10*f*.

4.3.5 Editing

The mark and/or the feedback for an anchor can be edited in the marking panel. In the example shown in FIG. 10*g*, both mark and feedback exist for the positional entity. The feedback is edited to improve it. The mark is deleted (deletion is also an editing operation), transforming the positional entity into one that only carries feedback information.

Editing in the marking panel propagates to the answer as it is being done, changing marks in anchors, changing positional feedback, or deleting anchors and associated information completely. In an alternate embodiment, changes will only be accepted and propagated after a commit or OK button is pressed, and will be discarded if a cancel button is pressed.

4.3.6 Deletion

Figure 10H:
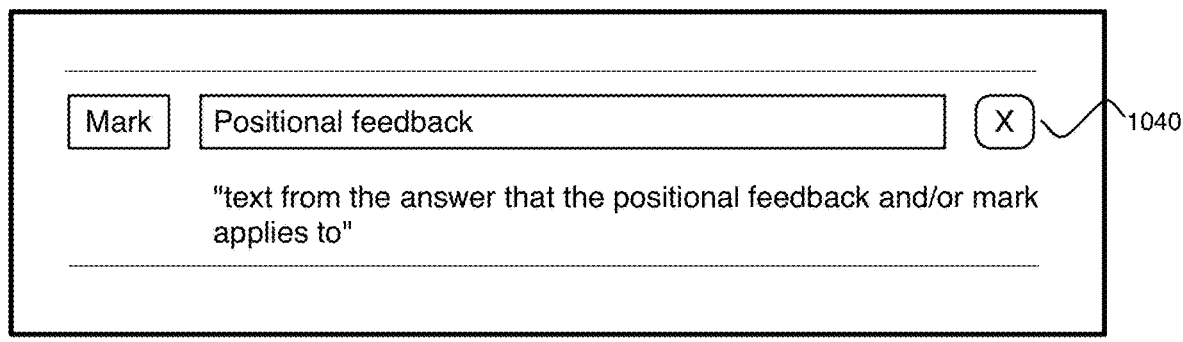

A positional entity is deleted by clicking on the delete icon 1040 displayed as part of the entity shown in FIG. 10*h*. Deletion makes the anchor and all its facilities disappear from the answer.

Deletion in the marking panel propagates to the answer as it is being done, changing marks in anchors, changing positional feedback, or deleting anchors and associated information completely.

4.3.5 Auto-summing grades

With reference to FIG. 10*i*, if one or more positional entities 1050 and 1051 include grades, all the positional grades 1052 and 1053 associated with a criterion 1054 are auto-summed to provide a grade 1055 for the criterion (the summed grade for the criterion may also include grades for the criterion from non-positional entities 1056). The criteria summed grades 1055 and 1057 may themselves be auto-summed to form a grade 1058 for the question.

Figure 10J:
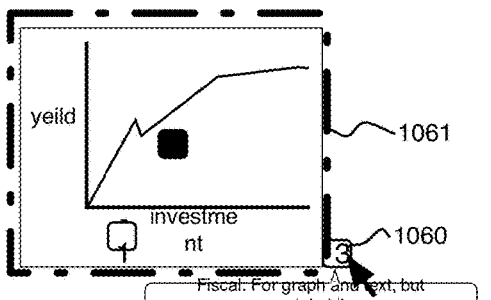

4.4 Positional entity behaviour in both the answer and in the marking panel 4.4.1 Interacting in the answer panel With reference to FIG. 10*j*, mousing over an anchor 1060 highlights the selection area 1061 and shows the associated criterion and any associated position feedback in the answer as discussed above. It also simultaneously highlights the corresponding entry 1062 in the marking panel.

This may be indicated through feedback, with dash-dotted rectangles, in FIG. 10*j*, showing feedback areas 1061.

An alternative embodiment, adds feedback to the criterion name in the marking panel.

In one embodiment, the marking panel entry may be hidden off screen in a scrolling panel. In such a case an informative message is shown "click anchor to bring the entry into view" in the marking panel. Doing that causes a scroll action that causes the entry to be brought into view.

4.4.2 Interacting in the marking panel

With reference to FIG. 10*k*, mousing over an entry 1070 in the marking panel highlights that entry 1070 in the marking panel. It also simultaneously highlights in the answer the selection area 1071 and shows the associated criterion and any associated position feedback in the answer as discussed above.

This may be indicated through feedback with dash-dotted rectangles in FIG. 10*k* showing feedback areas.

An alternative embodiment, adds feedback to the criterion name in the marking panel.

In one embodiment, the answer (panel) entry may be hidden off screen in a scrolling panel. In such a case an informative message is shown "click the entry to bring the anchor into view" is shown n the answer panel". Doing that causes a scroll action that causes the anchor to be brought into view.

Figures 11A, 11B, 11C, 11D, 11E:
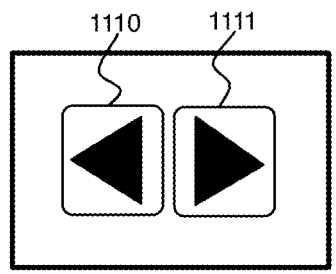
FIGS. 11a to 11e: show a user interface for displaying representations of grades for a question for multiple students for an assessment in accordance with an embodiment of the invention.

4.5 Navigation to answers to work with positional feedback and criteria 4.5.1 The student menu In FIG. 11*a* a student menu is shown. The student menu shows representations of aspects of the answer side by side.

Students are represented by simple string s1, s2, . . . to enable blind grading, where the grader does not know the identities of the students until marks are released for all taking the text.

Grades normalised to percentages (e.g. 5/25=20%), and colours of these percentages may distinguish between the following different kinds of marks:

Auto-graded to 0% because no answer was submitted
Part marked where not all criteria have been assigned at least one grade
Potentially fully marked where all criteria have been assigned at least one grade
Further
Unmarked answers are depicted with a percentage field set to - -

A student answer may be displayed within the answer panel, and this is indicated by feedback of a menu item in the student menu (for example, the current student is indicated within the student menu by highlighting the grade 1100) as shown in FIG. 11*b*.

If there are more students than menu items for the available horizontal space for the menu then a conventional scroll bar appears and is used to navigate around the menu items as shown in FIG. 11*c*.

To support common grading operations a sorting option may be selected to sort the menu items into (ascending or descending) order of the marks currently assigned as shown in FIG. 11*d*.

Either sorted or unsorted by marks filtering can be applied to only show in the menu Fully marked answers, including those auto-marked to zero
Part or unmarked answers One potential advantage of showing part marked or unmarked answers within the student menu is that is indicates easily to the user which answers are currently unmarked and/or have not yet been completely marked.

The controls for sorting and filtering are two drop down menus, one for each purpose (radio buttons could be used).

As with any menu users can click on menu items to display within the answer panel to the corresponding answer and to display within grading panel associated grading information.

To assist stepping through different students' answers, a two button 1110 and 1111 mechanism may be provided to do this in left and right directions as shown in FIG. 11*e*.

This mechanism may provide an advantage when the user needs to rapidly compare all answers to a question. In an alternative embodiment, answers may be stepped through using keyboard input such as left and right arrow keys.

4.5.2 The overview

When marking it is sometimes useful to see an overview that shows grades for each answer in the assessment, the grade achieved by each student for each question.

One advantage of the overview may be that it is easy for a user to identify anomalies across the answers for a student, identify anomalies across the answers for a question, identify failing students, and navigate the answers provided by all the students for review or marking purposes.

A method for displaying the overview uses a grade tableaux, where students are listed on one axis, and questions along the other axis as shown in FIG. 12*a*. Grades achieved by all students are shown along a row, and grades achieved by a student in all questions appear in a column. The grades shown are as marked so far, and the overview can be shown at any time so as to help determine what should be marked next, or find answers to review using the positional entity/criterion mechanism above.

Grades may be normalised to percentages (e.g. 5/25=20%), and colours of these percentages may distinguish between these kinds of marks:

Auto-graded to 0% because no answer was submitted
Part marked where not all criteria have been assigned at least one grade
Potentially fully marked where all criteria have been assigned at least one grade
Further
Unmarked answers are depicted with a percentage field set to - -

Figure 12B:
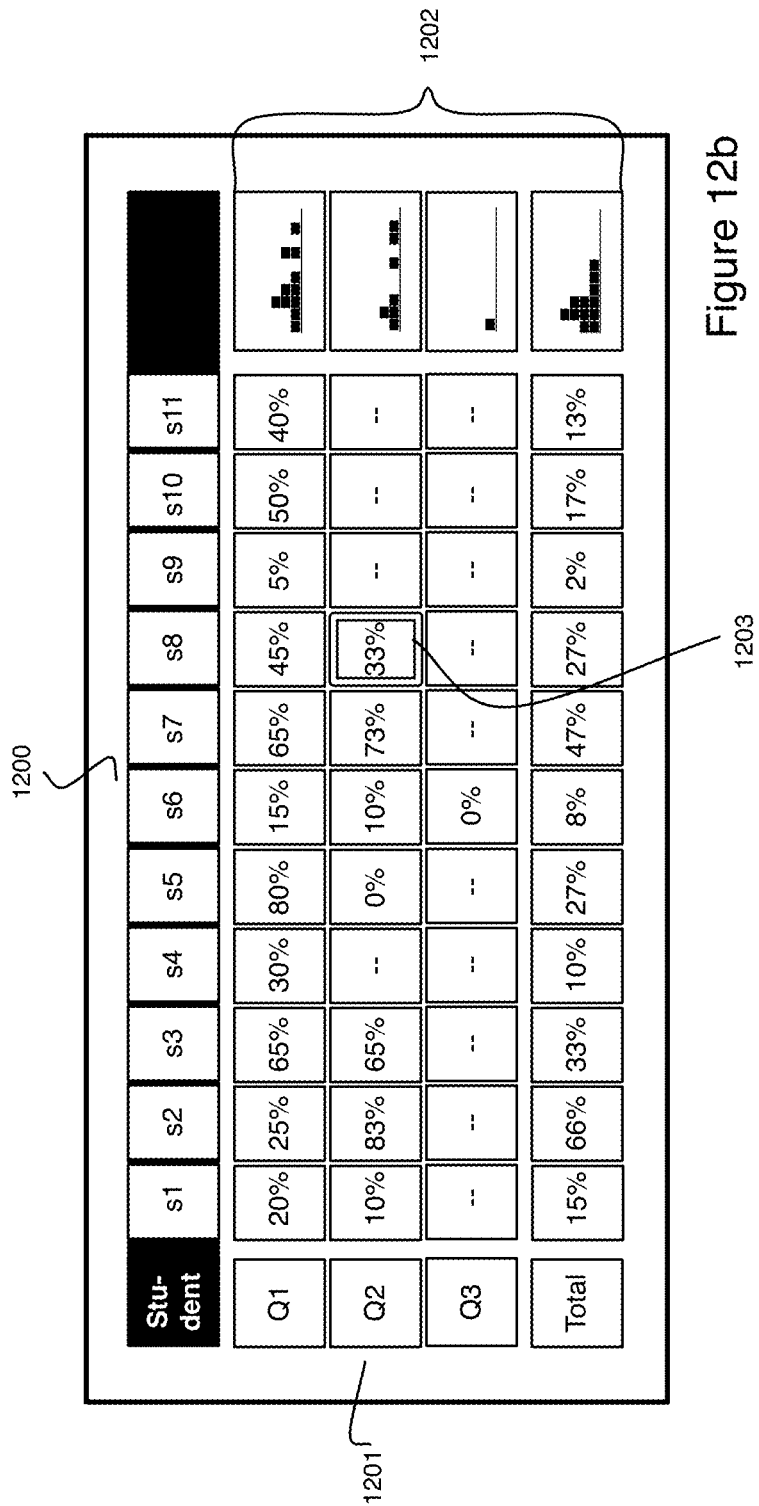

An alternate embodiment of the overview is shown in FIG. 12*b*. This overview may be invoked by clicking a button within the marking user interface described above.

The top row 1200 holds anonymized student IDs to identify the contents of columns. The left column 1201 holds question and total identifiers to identify the contents of rows.

In this view the left to right column order appears in anonymized student IDs. This indicated by the student ID row 1200 being highlit (shown as black in FIG. 12*b*).

At the end of each row is a histogram of marks 1202 allocated so far for the question or total marks for students. These have hover behaviour, when the cursor is held over one of them a hover box appears showing various statistics about marks (lowest, highest, mean, standard deviation, and various statistics about marking, percentage marked, part marked and unmarked).

The overview will have been reached by transitioning from a marker display for a particular student's answer for a particular question. This answer is identified in the grid with a highlit answer 'tile' 1203 (showing mark to date for that answer). In FIG. 12*b* it is s8's answer to q2. This highlight is shown in FIG. 12*b* with a double boundary.

The overview is a navigational aid, it allows identification of answers which are not completely marked, or whose total allocated grade, within the larger pattern of grades allocated, indicate the need for further grading activity or grade refinement. Clicking on a tile in the grid takes the user to the appropriate answer displayed in the grader. A separate button in the overview allows return to the last answer being marked (s8 Q2's answer in the example in FIG. 12*b*).

Figure 12C:
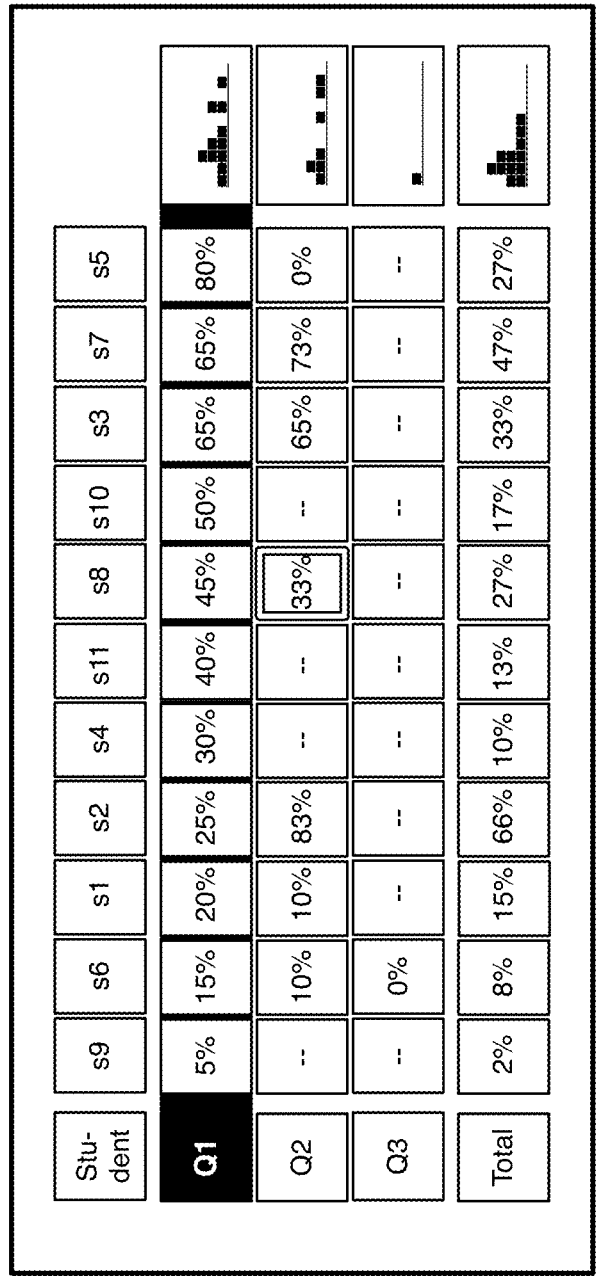

To further aid mark exploration and discovery of answers warranting further grading attention, the columns holding marks may be sorted on the contents of any row. The sort ordering after invoking the overview is as above, by anonymized student ID, an example of a sort on the marks allocated to date for Q1's answers is shown in FIG. 12*c*. As before row highlighting (in black in FIG. 12*c*) shows what the row is being used for column sort ordering.

If the matrix is bigger than the page, then the browser may shows scroll bars for the user.

Figure 12D:
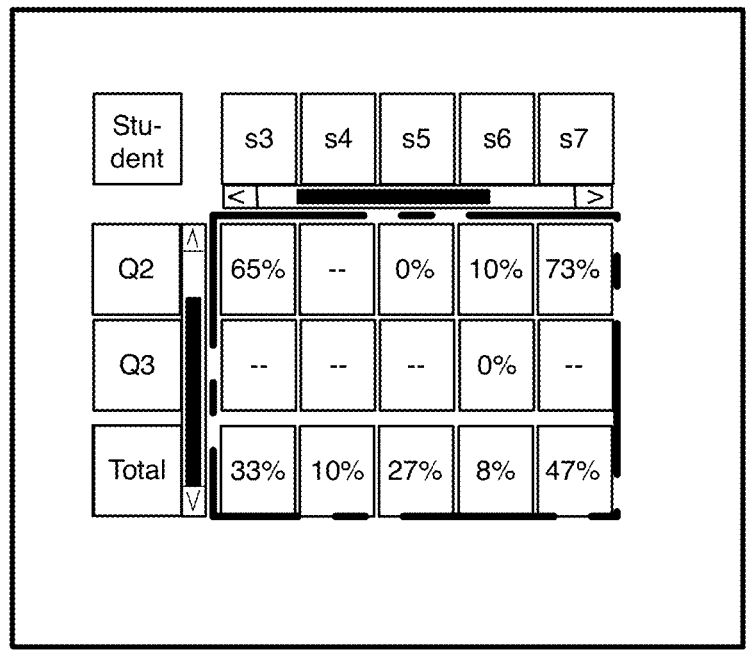

Alternatively, scroll bars may be applied for a more usable page display that keeps the top row and left column in view, thus, where dashed lines show the scrolling area whose content is determined by the horizontal and vertical scroll bars as shown in FIG. 12*d*.

Figure 12E:
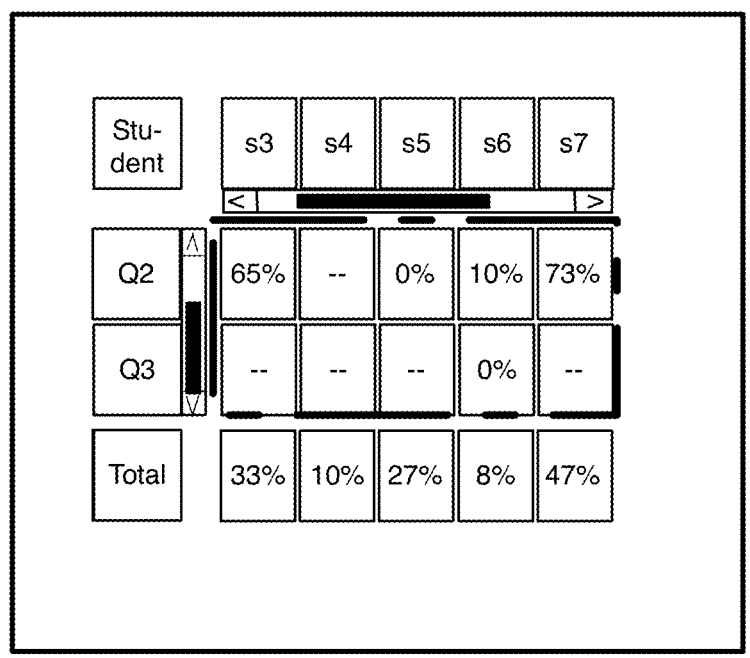

As a yet further alternative, the totals may also be kept in view permanently when scroll bars are necessary as shown in FIG. 12*e*.

4.5.3 Flags

A grader may flag any answer to remind the grader to return to the answer for further grading activity, e.g. to refine the positional marks and feedback allocated so far.

The grading panel has a button that the user may click to set the flag, and reset the flag when there is no longer any need for the flag 1300 as shown in FIG. 13*a*.

When a flag is set for an answer, the button changes to indicate this, and the flag appears in the student menu and the overview.

Figure 13B:
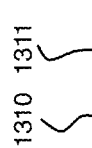

An example is shown in FIG. 13*b*, showing flags 1310 and 1311 for s7 and s8's answers in the Q2's student menu.

Figure 13C:
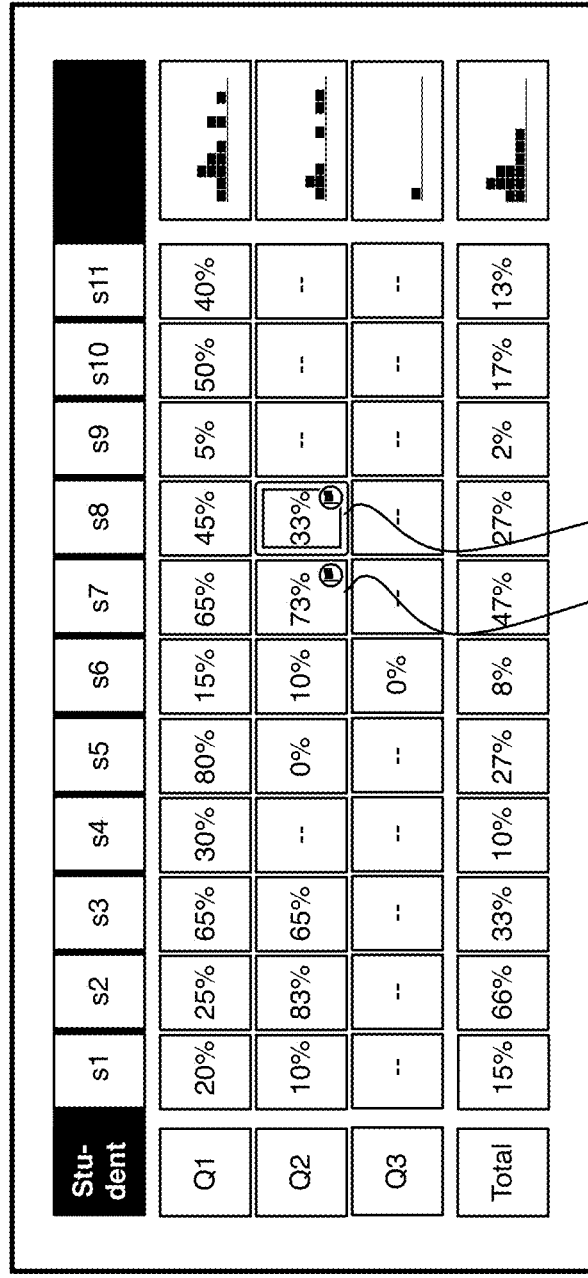

The example within the overview is shown in FIG. 13*c*.

4.6 Further feedback reuse functionality

The idea of 'precanned' feedback is useful because it enables a user to reuse feedback across assessments.

The mechanism for precanned feedback is to load up a canned feedback panel with feedback statements. These statements are editable while grading—advantage, a grader often wants to refine feedback, in this case to make it more generally applicable, or more specific as the grader finds students need a more specific piece of feedback to better address their (learning) needs.

Figure 14A:
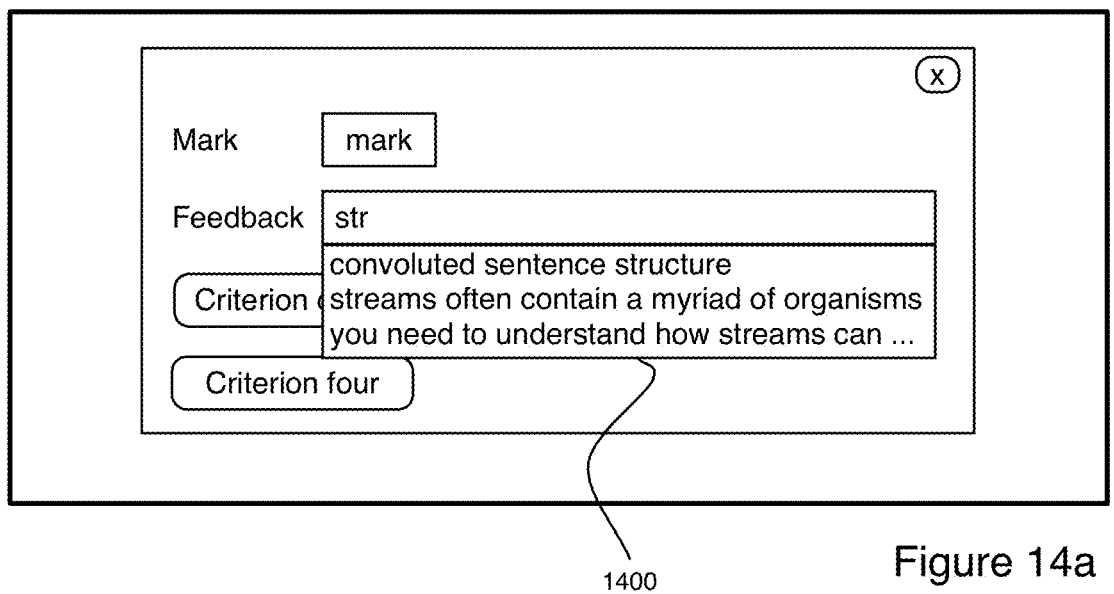
FIGS. 14a to 14b: show a user interface for reusing feedback in a method of marking an assessment in accordance with an embodiment of the invention.

These feedback statements appear in the drop down menu 1400 as shown in FIG. 14*a*.

Figure 14B:
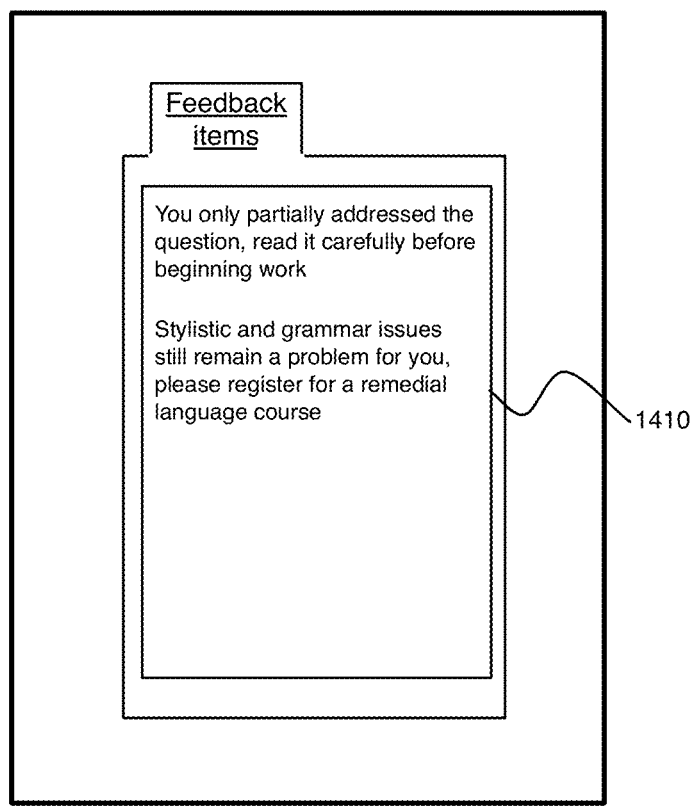

The precanned feedback panel is shown in FIG. 14*b*.

The inner box 1410 is an editable text field, each paragraph is a feedback statement that appears as appropriate in the drop down menu.

5. Displaying grades and feedback as results

Results are the combination of marks and feedback. At least some of these marks and feedback are positional and tied to criteria.

5.2 The display

Figures 15A, 15B:
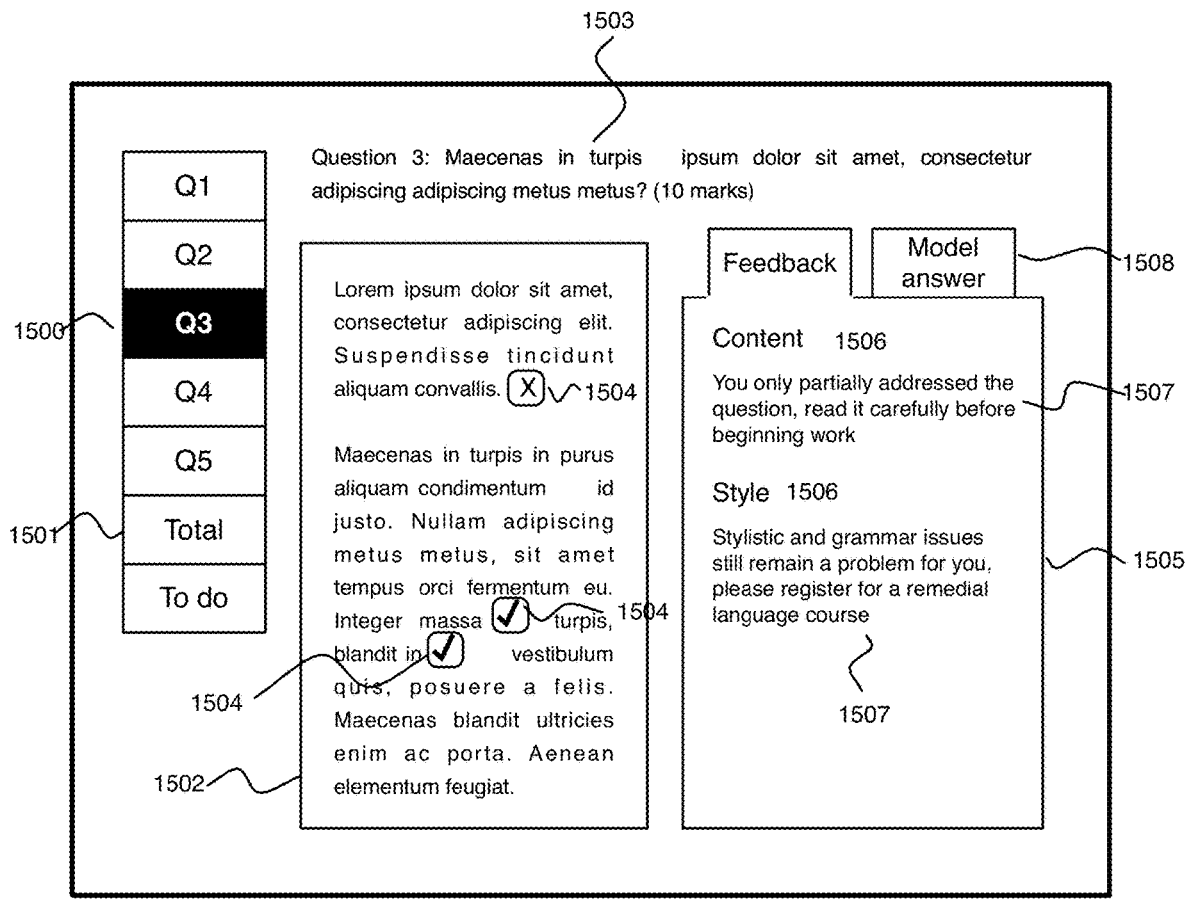

Feedback may be provided to a student within a display as shown in FIG. 15*a*. The display may comprise five parts: a question menu 1500 to enable students to select a question; a menu item 1501 indicating total marks for the assessment (and position amongst other students for the assessment); for each selected question, the question 1502 itself, the student's answer 1503 complete with anchors 1504 for positional feedback; and two tabbed panels one 1505 showing criteria 1506 and in those criteria general feedback 1507 for each criterion for the answer, and the other 1508 the model answer (if available) for the question.

An overall mark for the question may be displayed when the user positions the cursor over the question in the menu. Alternatively, the overall mark may be displayed persistently. Marks can be explicitly shown in anchors for positional marks and against criteria (assuming marks for the total are the sum of criteria marks, and each criterion mark is in turn composed of a general mark, possibly zero and zero or more positional marks).

Detailed marks may be hidden for maximising student feedback efficiency and only the total may be displayed. Thus for anchors in student results, the anchors are displayed as explained in the table in FIG. 15*b*.

Anchor and feedback panel behaviour is different to the marker. The selection area 1510 is shown for text and graphics when the cursor tip 1511 is over the anchor 1512, and associated criterion 1513 is shown with any positional feedback 1514 in a hover box. Three examples are shown in FIG. 15*c*.

Figure 15D:
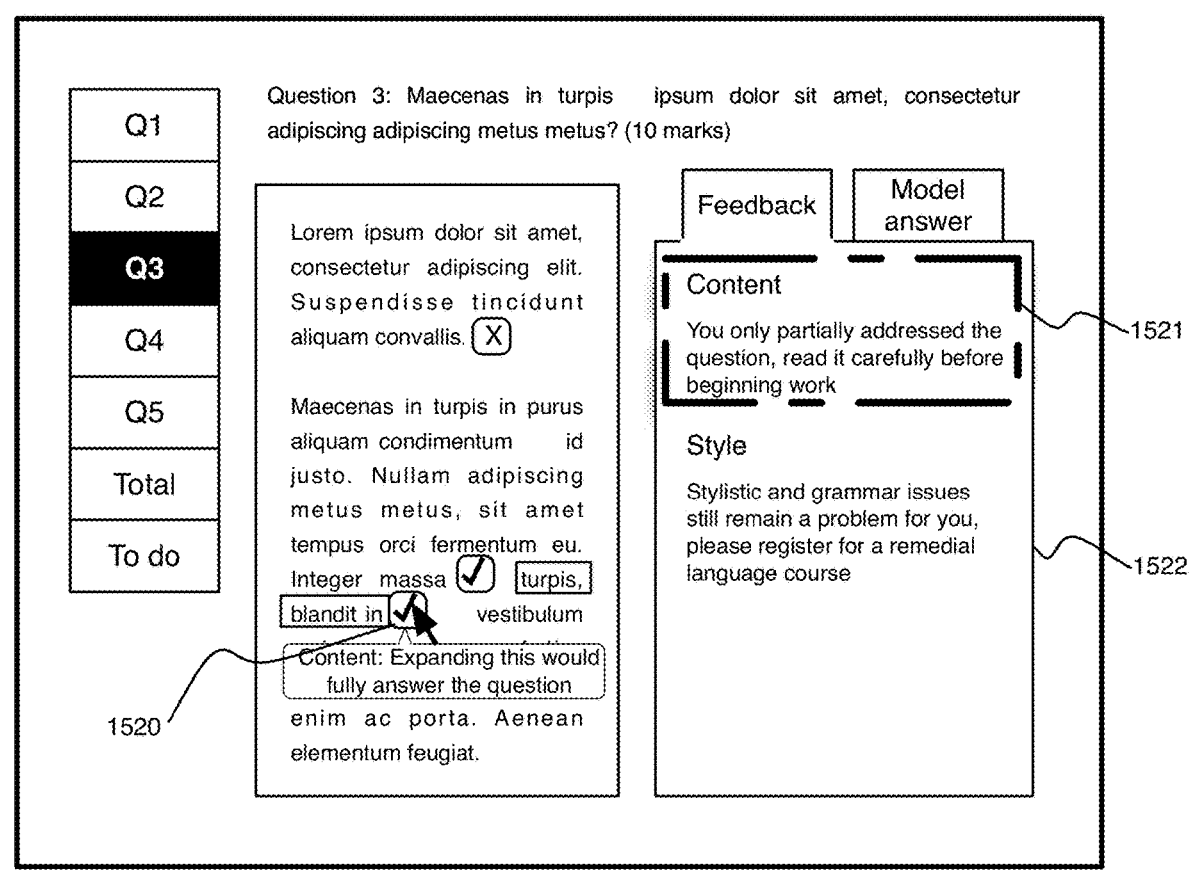

When an anchor 1520 is hovered over highlighting 1521 occurs in the feedback panel 1522 of the associated criterion and any general feedback of that criterion. Highlighting the criterion name is possible too. An example is shown in FIG. 15*d* where the feedback panel 1522 highlights the feedback within a dot dashed box 1521.

When the cursor is positioned over a criterion name in the feedback panel (and/or any following general feedback for the criterion) that are is high lit, and in the answer panel all anchors associated with that criterion are in a high lit state showing their positional area and hover information (criterion and any positional feedback). This provides a quick overview, sometimes with obscured information, of what positional entities are associated with the criterion. The user can then explore the answer anchors one by one to gather more detail.

5.2.1 Directing student attention

Anecdotal evidence is that students don't spend that long looking at feedback, therefore it is essential to make it easy for students to see and find information.

Figure 15E:
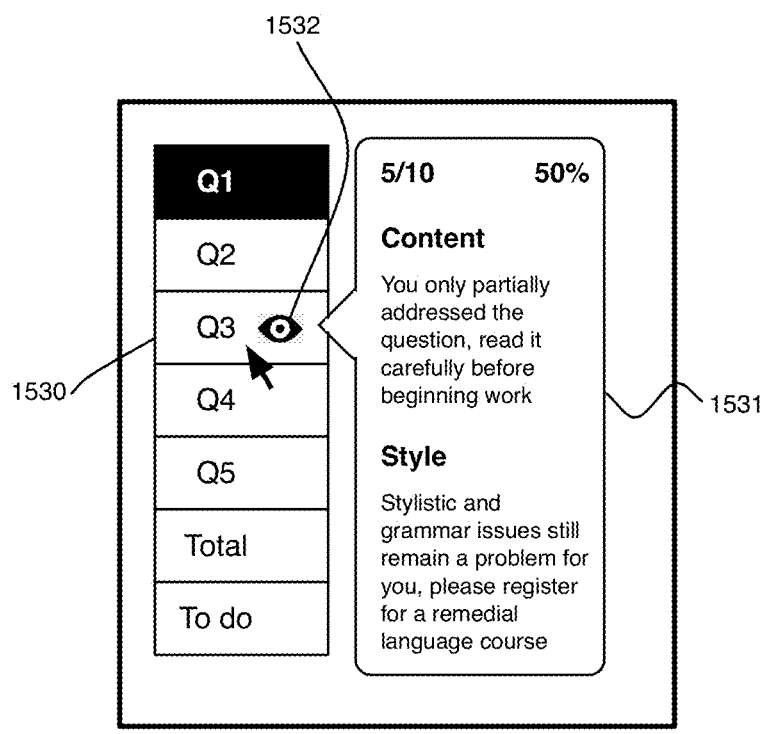

The following two features, as illustrated in FIG. 15*e*, assist in this respect, hovering over any menu item 1530 for a question (or the total) displays the associated marks and general feedback 1531. If there is positional feedback associated with the answer then a special symbol 1532 (in this example, an eye) appears in the menu.

5.3 Grader view of all student feedback

After all grading is done, the grader releases results to students, who see results (grades and feedback) as in 5.2.

The grader can see student results, stepping through them using arrow keys (alternative can also add in student menu) and search for students by name. Releasing results mean students can be de-anonymised.

The grader can see a student view, with detailed marks hidden, or a faculty view with marks shown, according to a control on the display.

Figure 16A:
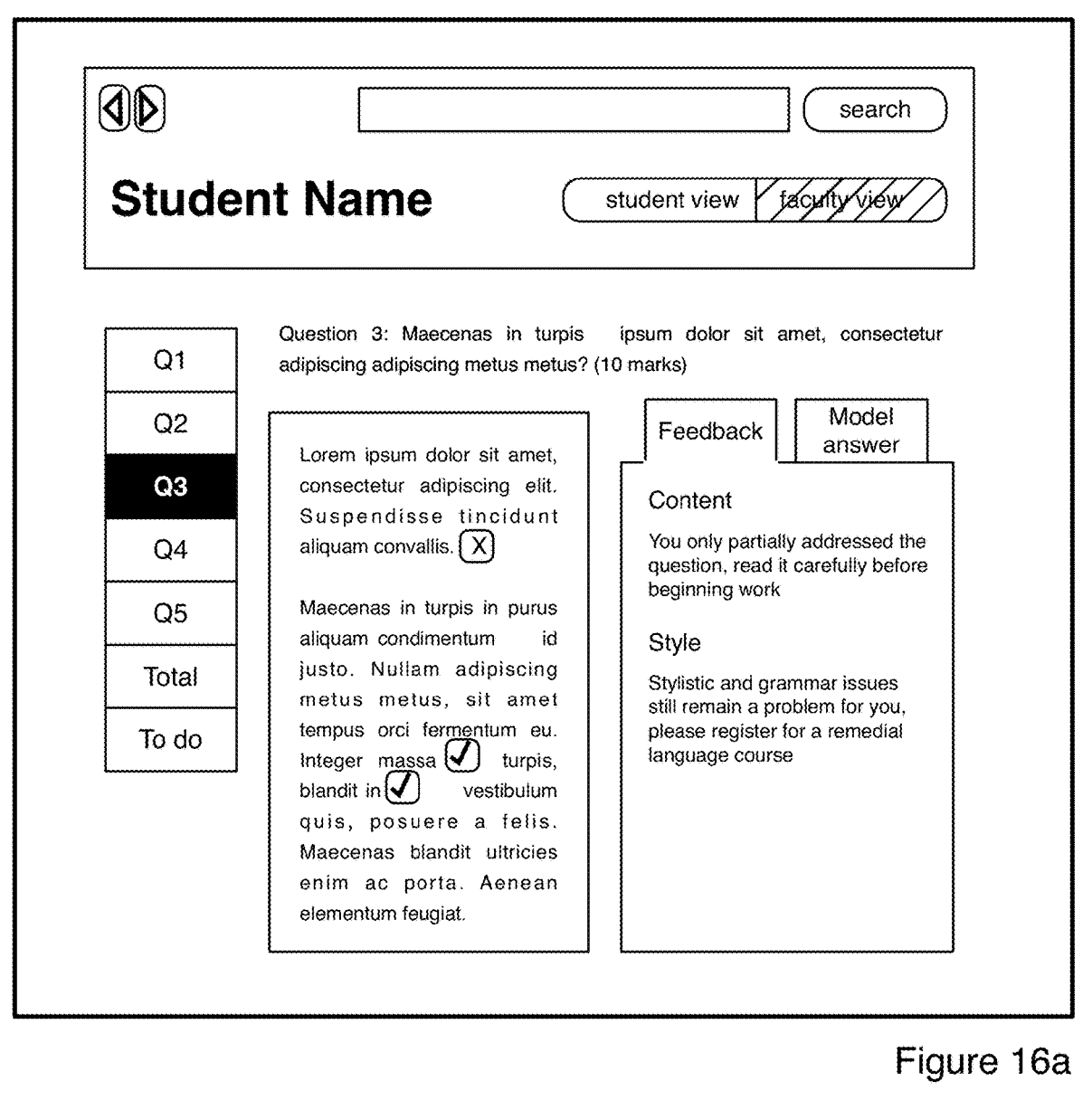

FIG. 16a shows a student view as seen by grader.

Figure 16B:
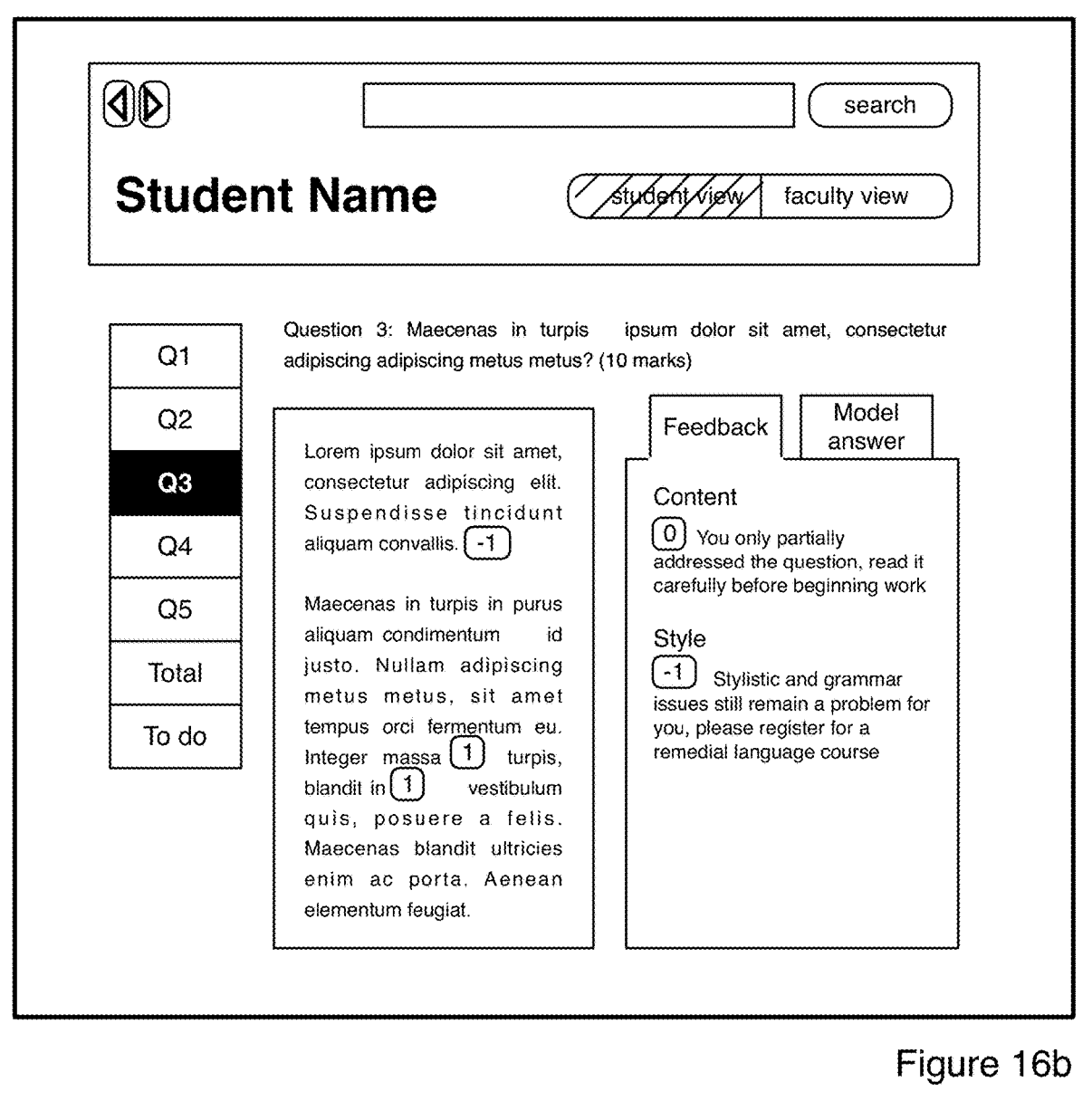

FIG. 16b shows a faculty view as seen by grader.

Potential advantages of some embodiments of the present invention include that grade accuracy for assessment is improved because information is provided to the marker on how the marks across the students' answers have been allocated, that feedback to students is improved, and that internal grade consistency is improved because information is provided to the marker to enable them to compare allocation of marks to the same questions.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A system for providing assessment management within a graphical user interface, including:
   an input configured to receive input from a user;
   a display; and
   a processor configured to:
      simultaneously display, within a graphical user interface displayed on the display, a question menu to enable the user to select a question for marking from a plurality of questions within an assessment, a student menu to enable the user to select different student's answers to a same question, a question selected from the question menu, an answer for the question selected from the question menu and a student selected from the student menu, and a marking panel including a marking or grading scheme for the selected question;
      in response to a first user input within the graphical user interface, select a plurality of portions or positions in the displayed answer;
      in response to a second user input within the graphical user interface, assign a grade to each of the selected portions or positions;
      associate each of the grades to one of a plurality of criteria in response to a third user input within the graphical user interface; and
      display, for each of the selected portion or position, an anchor in the displayed answer proximate to the selected portion or position, the anchor representing feedback and the grade input by the user for the selected portion or position;
      wherein a plurality of the grades in an answer are associated with one of the plurality of criteria.

2. The system of claim 1, wherein the processor is further configured to:
   in response to an input to the student menu selecting another student, control the display to display an answer for the other student for the question selected from the question menu, wherein the displayed answer for the other student includes a plurality of anchors associated with portions or positions in the displayed answer for the other student, each of the displayed anchors representing feedback and a grade input by the user for the portion or position associated with the anchor.

3. A system for providing assessment management within a communications network connecting a first user device, a second user device and a server, including:
   the first user device comprising a display and configured to:
      simultaneously display, within a graphical user interface on the display, a question menu to enable the user to select a question for marking from a plurality of questions within an assessment, a student menu to enable the user to select different students answers to a same question, a question selected from the question menu, an answer for the question selected from the question menu and a student selected from the student menu, and a marking panel including a marking or grading scheme for the selected question;
      in response to a first user input within the graphical user interface, select a plurality of portions or positions in the displayed answers;
      in response to a second user input within the graphical user interface, assign a grade and/or feedback to each of the selected portion or position;
      associate each of the grades and/or feedback to one of a plurality of criteria in response to a third user input at the first user device; and
      display on the display, for each of the selected portion or position, an anchor in the displayed answer proximate to the selected portion or position, the anchor representing the feedback and/or the grade input by the user for the selected portion or position;
   the second user device comprising a display and configured to display an answer on the display to a question within the assessment, to select an anchor displayed proximate to a portion or position in an answer associated with the answer to a question of one or more questions within an assessment in response to a first user input at the second user device, and to display the grade and/or feedback associated with the portion or position within the answer; and
   the server configured for configuring the first user device to select the plurality of portions or positions in the answer to the displayed question of one or more questions within the assessment in response to the first user input at the first user device, to assign a grade and/or feedback to each of the selected portions or positions in response to the second user input at the first user device and to associate each of the grades and/or feedback to one of a plurality of criteria in response to the third user input at the first user device, and for configuring the second user device to display the answer to the question within the assessment, to select the anchor displayed proximate to the portion or position in the answer associated with the answer to the question of one or more questions within the assessment in response to the first user input at the second user device, and to display the anchor representing the grade and/or feedback associated with the portion or position within the answer;
   wherein a plurality of the grades in an answer are associated with one of the plurality of criteria.

4. A system for storing data for assessments, including:
an input configured to receive input from a user;
a display; and
a processor configured to:
simultaneously display, within a graphical user interface on the display, a question menu to enable the user to select a question for marking from a plurality of questions within an assessment, a student menu to enable the user to select different students answers to a same question, a question selected from the question menu, an answer for the question selected from the question menu and a student selected from the student menu, and a marking panel including a marking or grading scheme for the selected question;
in response to a first user input, select a plurality of portions or positions in the displayed answer;
in response to a second user input, assign a grade to each of the selected portions or positions;
associate each of the grades to one of a plurality of criteria in response to a third user input;
display on the display for each of the selected portion or position, an anchor in the displayed answer proximate to the selected portion or position, the anchor representing the grade input by the user for the selected portion or position;
a database configured for storing associations between each of one or more grades and a corresponding portion or position within each of a plurality of answers for each of a plurality of assessments;
wherein a plurality of the grades in an answer are associated with one of the plurality of criteria.

* * * * *